United States Patent [19]

Nakayama

[11] Patent Number: 5,111,338
[45] Date of Patent: May 5, 1992

[54] ZOOM LENS

[75] Inventor: Hiroki Nakayama, Kawasaki, Japan

[73] Assignee: Canon Kabushiki Kaisha, Tokyo, Japan

[21] Appl. No.: 654,191

[22] Filed: Feb. 12, 1991

[30] Foreign Application Priority Data

Feb. 17, 1990 [JP] Japan ................... 2-037066

[51] Int. Cl.$^5$ .................... G02B 15/16; G02B 15/177
[52] U.S. Cl. ..................... 359/686; 359/685
[58] Field of Search ........ 350/423, 426, 427; 359/680, 685, 686

[56] References Cited

U.S. PATENT DOCUMENTS 4,702,567 10/1987 Kato et al. ............ 350/423 X
4,787,718 11/1988 Cho ..................... 350/423 X

FOREIGN PATENT DOCUMENTS 63-271214 9/1988 Japan .
64-72114 3/1989 Japan .

Primary Examiner—Scott J. Sugarman
Attorney, Agent, or Firm—Fitzpatrick, Cella, Harper & Scinto

[57] ABSTRACT

A zoom lens comprising, from front to rear, a first lens unit of negative power, a seconde lens unit of positive power, a third lens unit of positive power and a fourth lens unit of negative power, wherein zooming from the wide-angle end to the telephoto end is performed by moving at least the second and fourth lens units toward the object side in such a way that the air separations between the first and second lens units and between the third and fourth lens units are shorter in the telephoto end than in the wide-angle end.

17 Claims, 19 Drawing Sheets

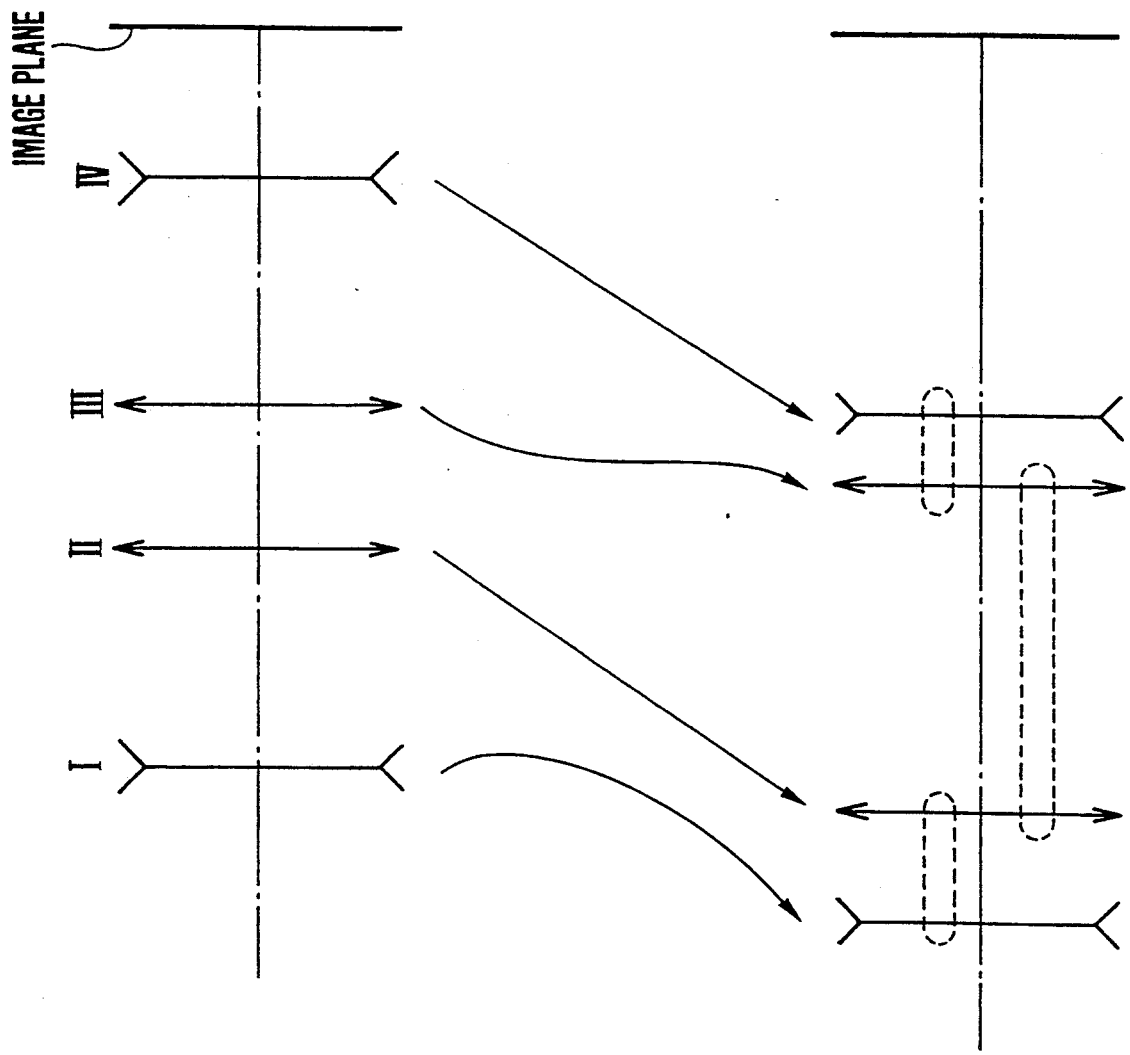
F I G. 1(A)
F I G. 1(B)

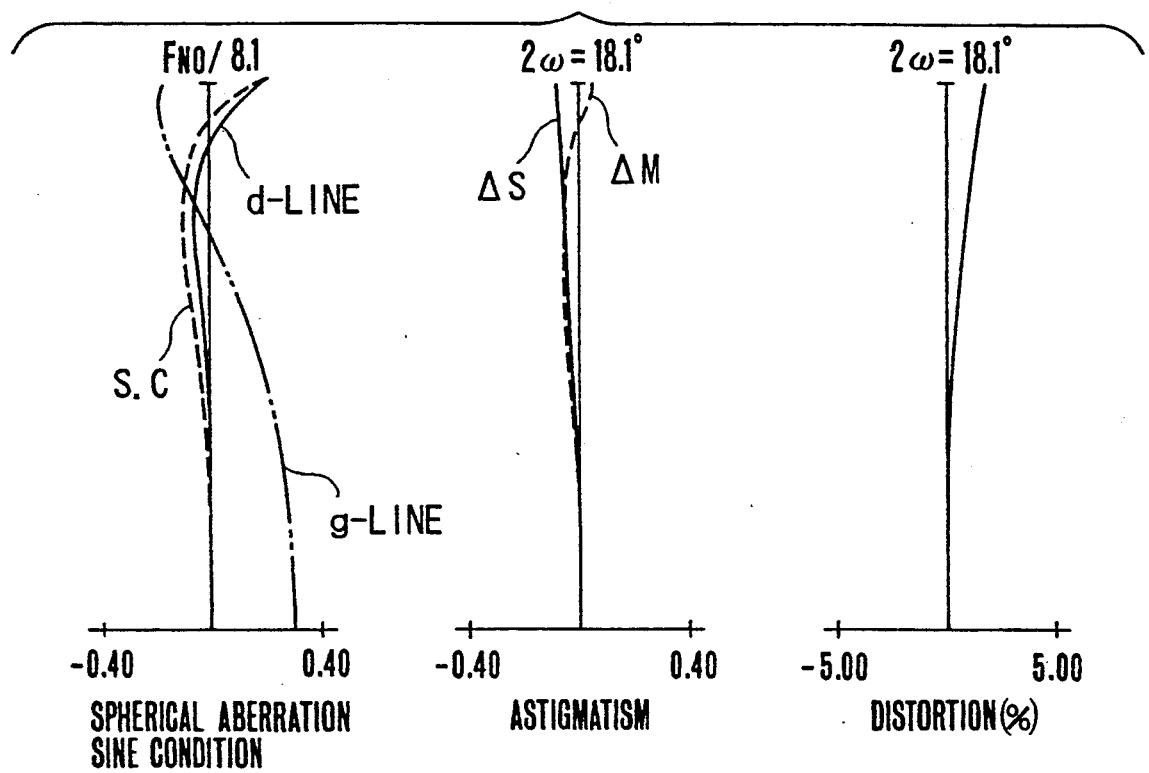

SP

IMAGE PLANE

SP

IMAGE PLANE

ZOOM LENS

BACKGROUND OF THE INVENTION

1. Field of the Invention

This invention relates to zoom lenses of high range and small size suited to lens-shutter cameras, video cameras, etc. and, more particularly, to zoom lenses of shortened back focal distance which have attained a shortening of the total length of the lens (the distance from the front vertex to the image plane) and are excellent in portability.

2. Description of the Related Art

Recently, along the trend to advance the reduction of the bulk and size in the lens-shutter cameras, video cameras, etc. has come a demand for zoom lenses of reduced size with a shortening of the total length. Of these zoom lenses, the one including the standard angle of view (the total angular field coverage: $2\omega=47$ degrees, or, in reduction to the 35 mm still camera, the focal length: 50 mm or thereabout) and having a relatively small size is proposed in, for example, Japanese Laid-Open Patent Applications Nos. Sho 63-271214 and Sho 64-72114.

These publications disclose the so-called 3-component zoom lens comprising, from front to rear, a first lens unit of negative refractive power, a second lens unit of positive refractive power and a third lens unit of negative refractive power, these three lens units being moved each forward under a certain condition to provide a zoom ratio of about 2, as zooming from the wide-angle end to the telephoto end.

The zoom lenses have generally a feature that strengthening of the refractive power of every lens unit reduces the required amount of movement of each of the lens units for obtaining the predetermined zoom ratio. By relying on this, it becomes possible to shorten the total length of the lens. The mere increase of the refractive power of every lens unit, however, results in an increase of the range of variation of aberrations with zooming. Particularly in application to the case of greatly extending the range, there is a problem of increasing the difficulty of obtaining a good optical performance throughout the entire zooming range.

SUMMARY OF THE INVENTION

The present invention is to add improvements to the zoom lens of the previous proposals in the aforesaid Japanese Laid-Open Patent Applications Nos. Sho 63-271214 and Sho 64-72114 and has a first object to provide a zoom lens comprising four lens units as a whole with a particular emphasis in a shortening of the total length of the lens despite the extension of the range to 5-7 in the zoom ratio.

Another or second object is to provide a zoom lens of reduced size while still getting a high optical performance throughout the entire extended zooming range.

BRIEF DESCRIPTION OF THE DRAWINGS

FIGS. 1(A) and 1(B) and FIGS. 8(A) and 8(B) are diagrams for explaining the paraxial refractive power arrangements for the wide-angle end and the telephoto end of the zoom lens of the invention.

FIGS. 5(A), 5(B) and 5(C), FIGS. 6(A), 6(B) and 6(C), FIGS. 7(A), 7(B) and 7(C), FIGS. 12(A), 12(B) and 12(C), FIGS. 13(A), 13(B) and 13(C) and FIGS. 14(A), 14(B) and 14(C) are graphic representations of the various aberrations of the numerical examples 1, 2, 3, 4, 5 and 6 of the invention respectively.

In FIGS. 2(A), 2(B) and 2(C) to FIGS. 7(A), 7(B) and 7(C) and FIGS. 12(A), 12(B) and 12(C) to FIGS. 14(A), 14(B) and 14(C), (A) designates the wide-angle end, (B) an intermediate, and (C) the telephoto end.

In FIGS. 1(A) and 1(B) and FIGS. 8(A) and 8(B) to FIGS. 11(A) and 11(B), (A) designates the wide-angle end and (B) the telephoto end.

In the figures, I denotes the first lens unit, II the second lens unit, III the third lens unit, and IV the fourth lens unit. SP stands for the stop, d for the spectral d-line, g for the g-line, S.C. for the sine condition, S for the sagittal image surface, and M for the meridional image surface.

DETAILED DESCRIPTION OF THE PREFERRED EMBODIMENTS

Figure 2A:
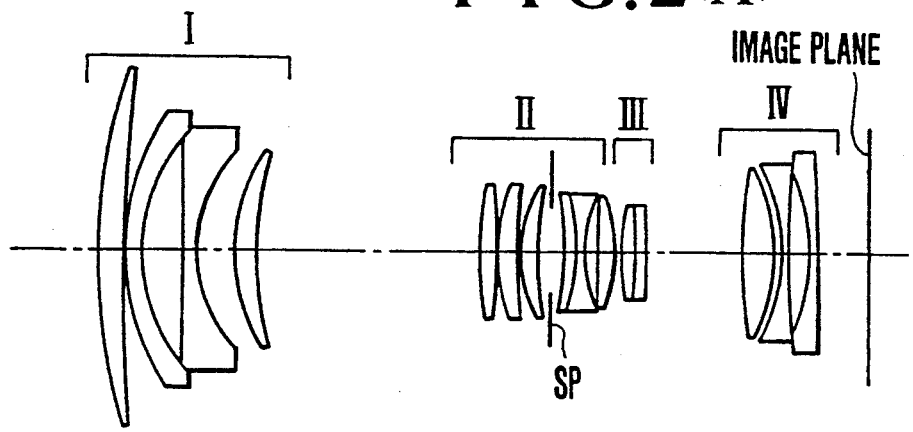
FIGS. 2(A), 2(B) and 2(C), FIGS. 3(A), 3(B) and 3(C), FIGS. 4(A), 4(B) and 4(C), FIGS. 9(A) and 9(B), FIGS. 10(A) and 10(B) and FIGS. 11(A) and 11(B) are longitudinal section views of numerical examples 1, 2, 3, 4, 5 and 6 of the invention respectively.
Figure 2B:
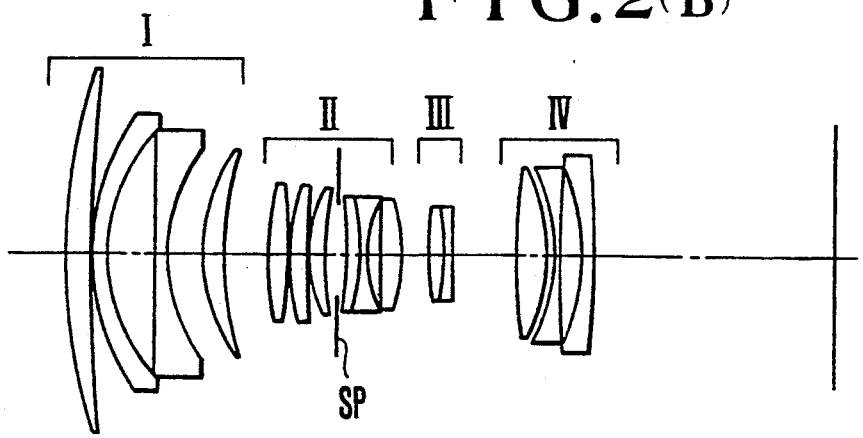
Figure 2C:
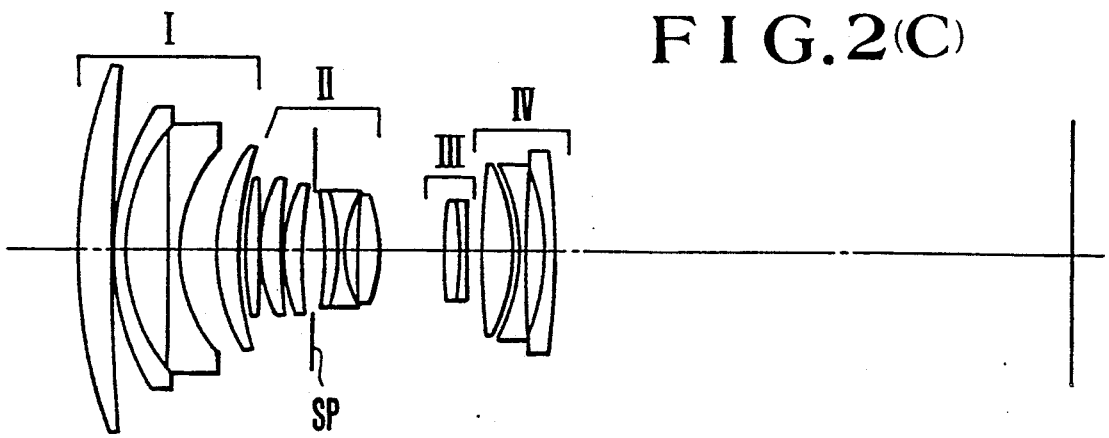
Figure 3A:
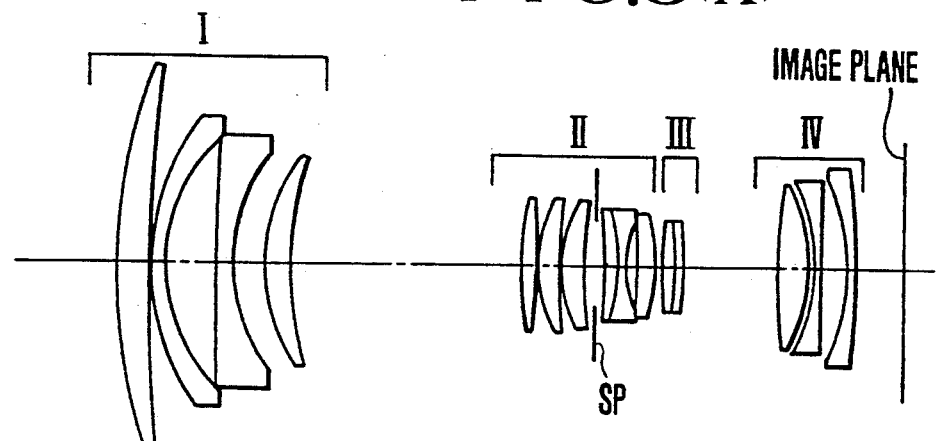
Figure 3B:
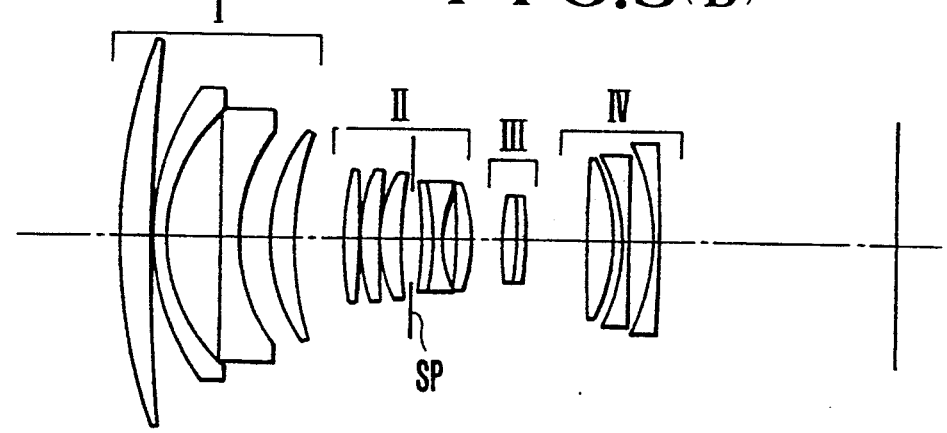
Figure 3C:
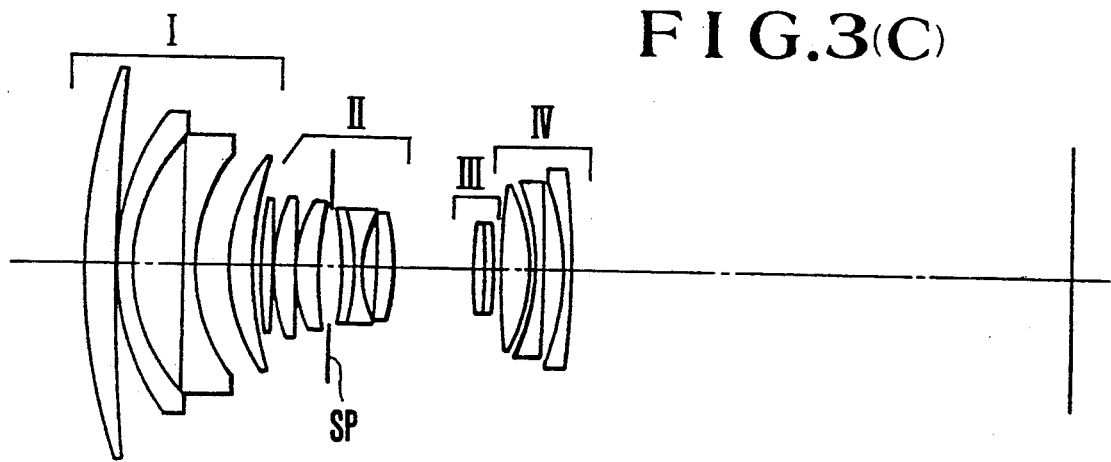
Figure 4A:
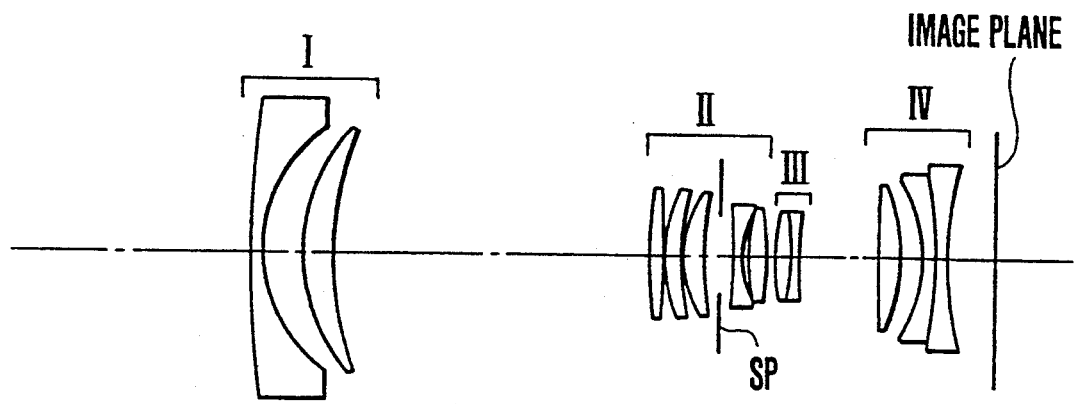
Figure 4B:
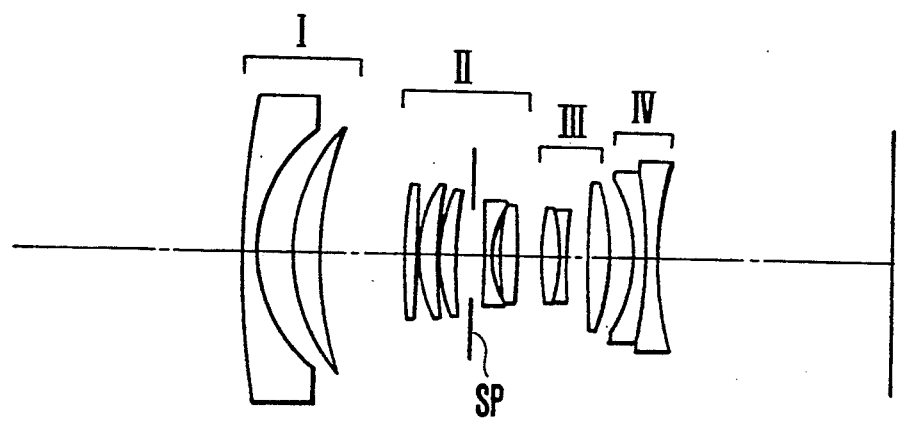
Figure 4C:
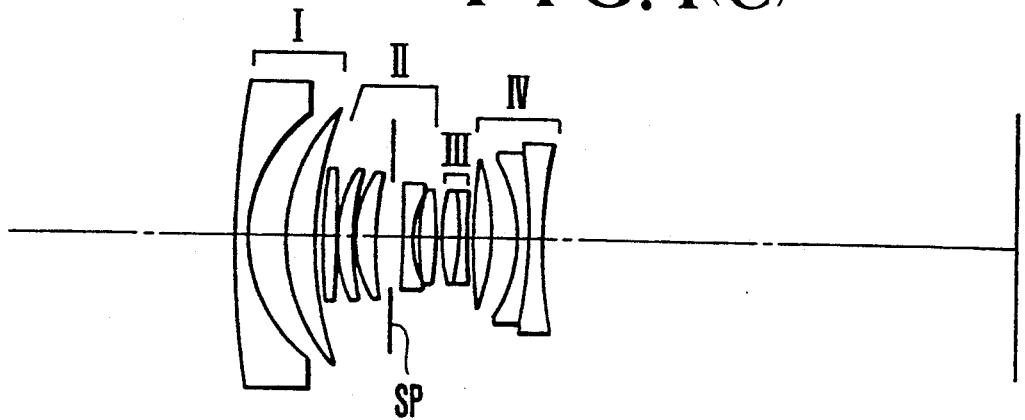
Figure 5A:
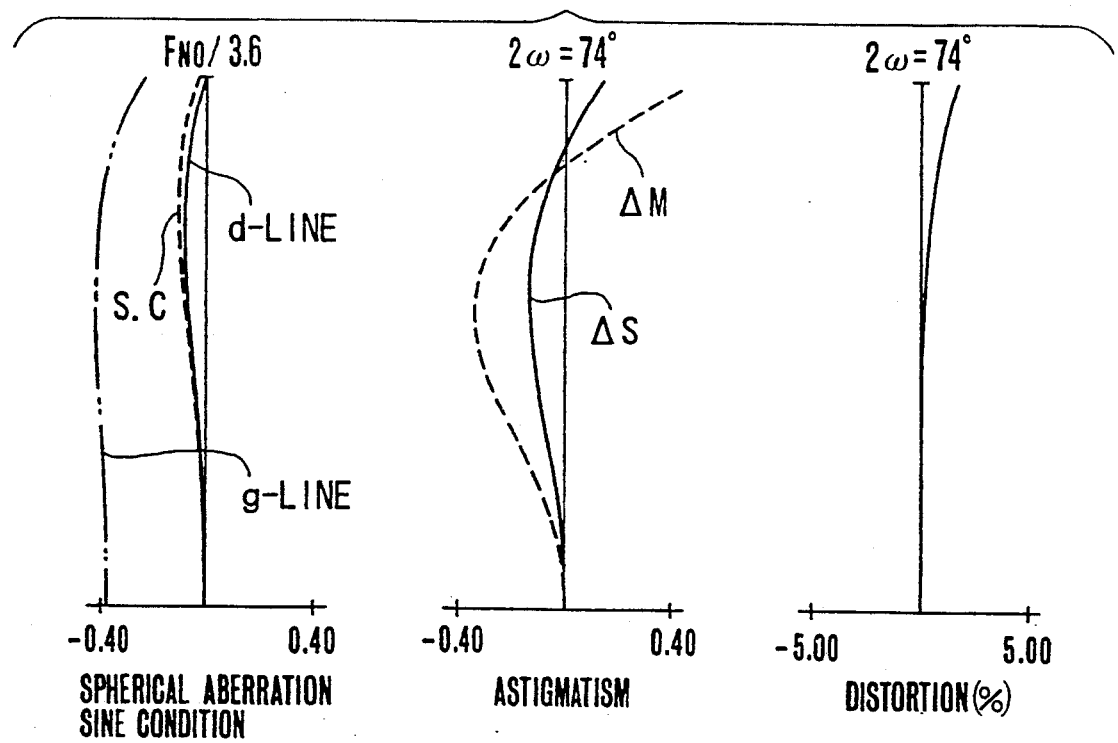
Figure 5B:
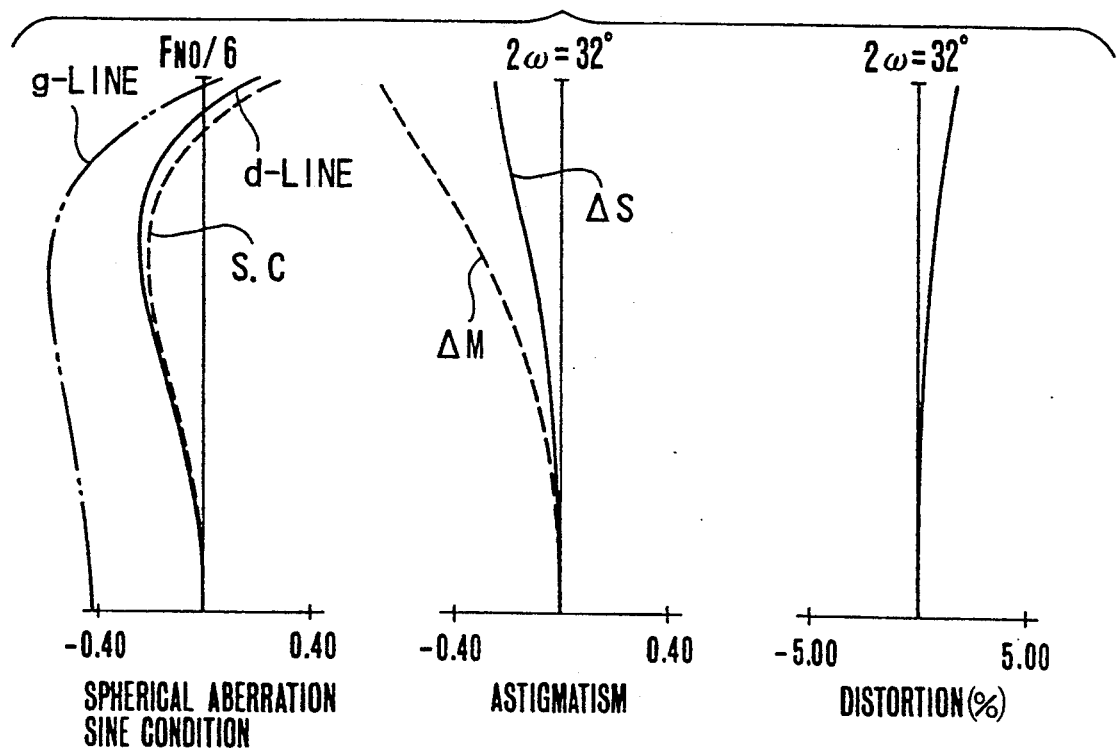
Figure 5C:
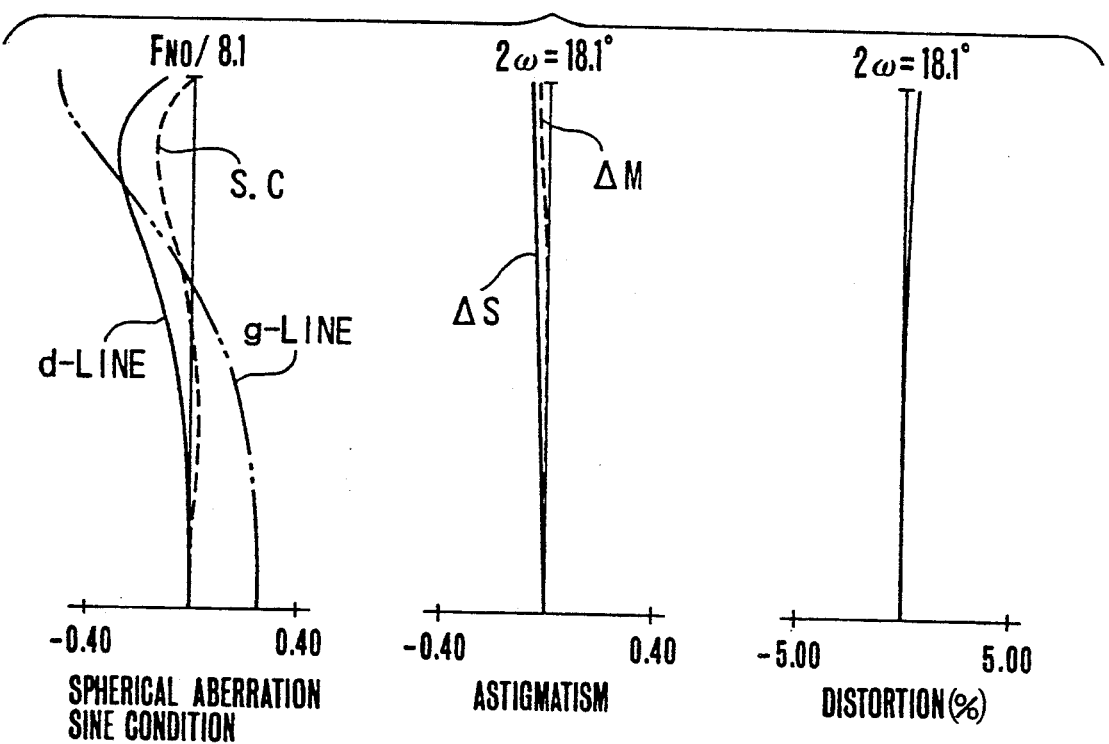
Figure 6A:
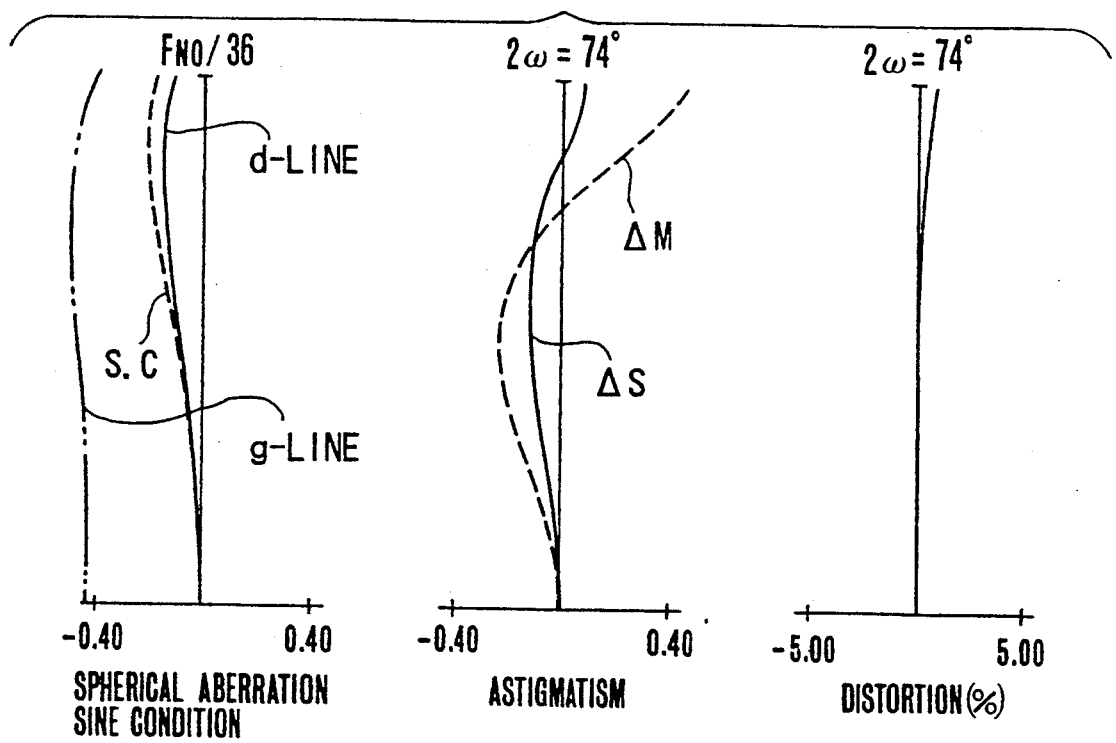
Figure 6B:
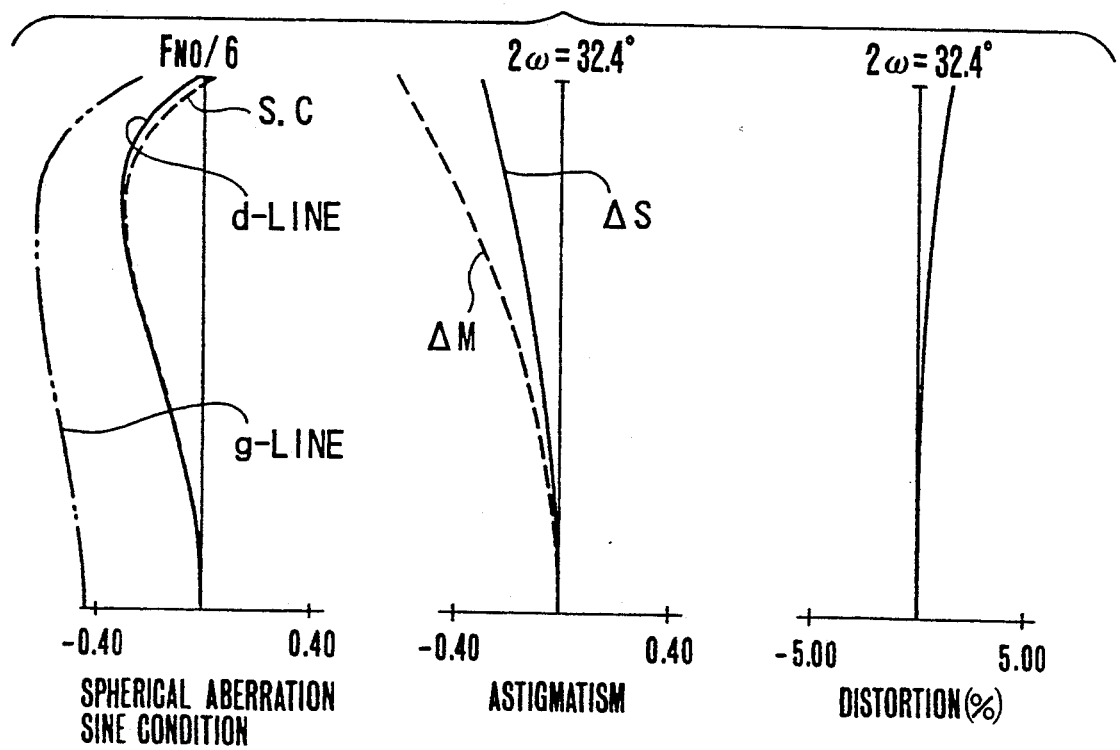
Figure 6C:
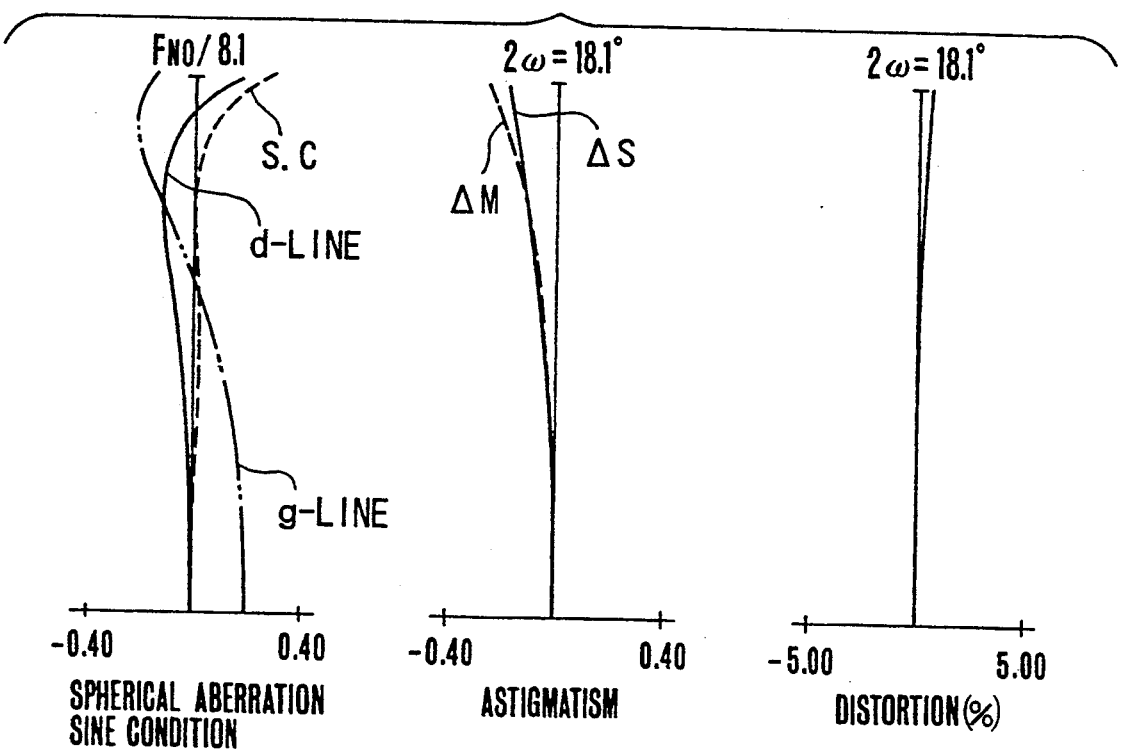
Figure 7A:
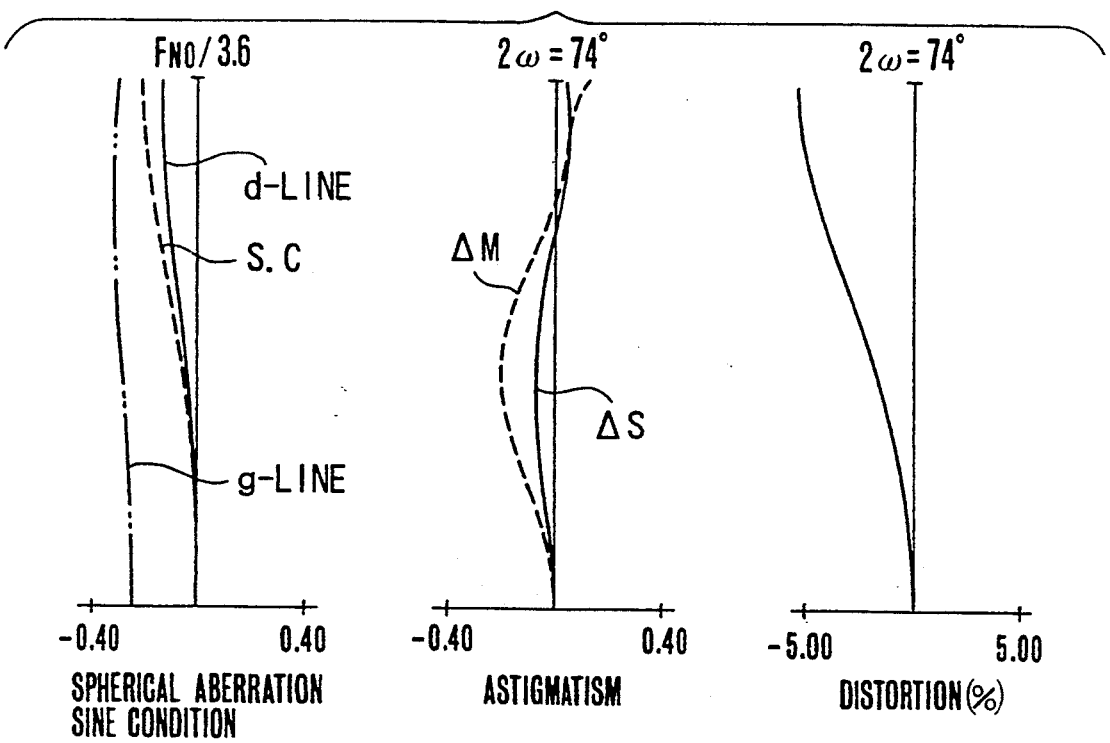
Figure 7B:
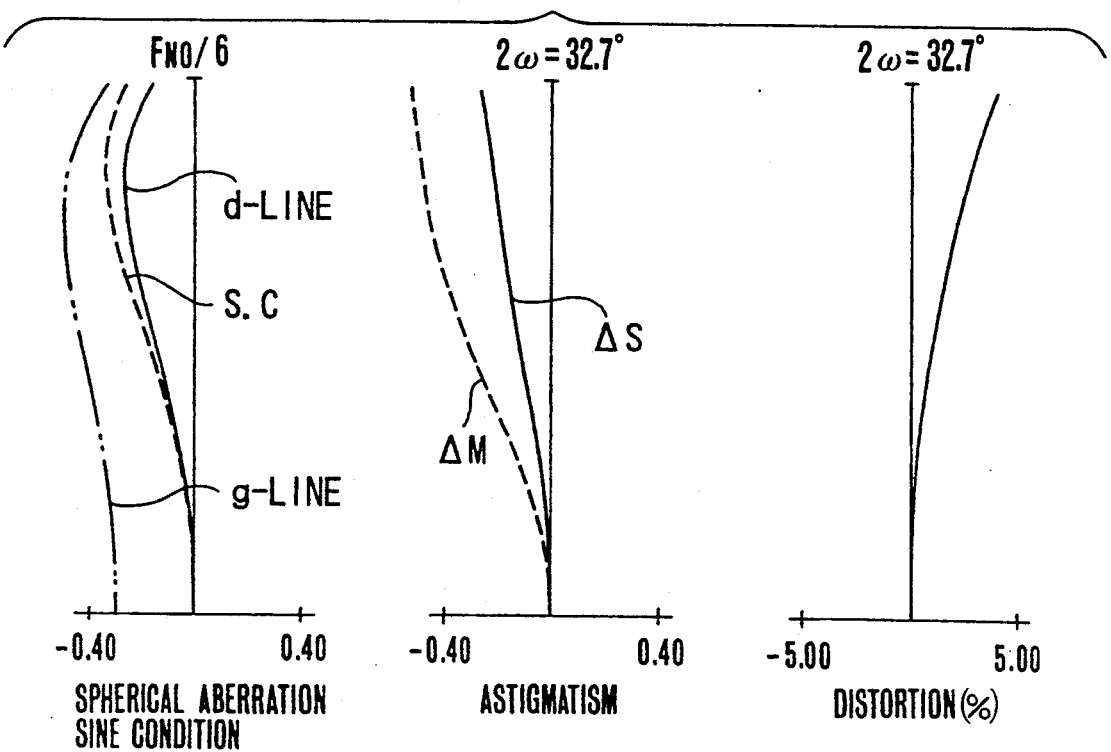

FIGS. 1(A) and 1(B) schematically show the change of the refractive power arrangement of the thin lenses of the zoom lens system of the invention between the operative positions at the wide-angle end (A) and the telephoto end (B). Three examples 1, 2 and 3 of specific zoom lenses of an embodiment of the invention are shown in the block diagrams of FIGS. 2, 3 and 4 suffixed (A) for the wide-angle end, (B) for an intermediate zooming position and (C) for the telephoto end respectively.

Referring to these figures, the zoom lens comprises, from front to rear, a first lens unit I of negative refractive power ($\phi 1$), a second lens unit II of positive refractive power ($\phi 2$), a third lens unit III of positive refractive power ($\phi 3$) and a fourth lens unit IV of negative refractive power ($\phi 4$).

The arrows indicate the directions in which the lens units move as zooming is performed from the wide-angle end to the telephoto end.

The zoom lens according to the present embodiment operates in such a manner that as zooming from the wide-angle end to the telephoto end, all the first lens unit to the fourth lens unit are made to move forward in differential relation as shown in FIGS. 1(A) and 1(B) from one another, such that each of conditions to be described later is satisfied. By using such a scheme of moving all the lens units forward as zooming from the wide-angle end to the telephoto end, a shortening of the total length for the wide-angle end of the zoom lens is efficiently carried out. In other words, it employs the refractive power arrangement that allows the total length of the lens to get short on the wide-angle side and to get long on the telephoto side.

Next, features of the paraxial refractive power arrangement of the zoom lens in the present embodiment are explained below.

When the first lens unit of refractive power $\phi 1$ and the second lens unit of refractive power $\phi 2$ are arranged with their principal points at an interval e, the overall retractive power $\phi$ of the entirety of the lens system is given by the following expression:

$$\phi = \phi 1 + \phi 2 - e\phi 1 \cdot \phi 2$$

In this case, to vary the overall refractive power $\phi$, or vary the focal length, the principal point interval e can be varied as follows:

(i) For the refractive powers $\phi_1$ and $\phi_2$ both having positive values, when decreasing the overall refractive power $\phi$, or when zooming toward the telephoto end, an increase in the principal point interval e is used.

(ii) When the refractive powers $\phi_1$ and $\phi_2$ are of opposite sign, decreasing of the overall refractive power $\phi$, or zooming to the telephoto end, is performed by decreasing the principal point interval e.

The zoom lens of the present embodiment, as is apparent from the change of the refractive power arrangement of all the lens units shown in FIGS. 1(A) and 1(B), has the refractive power relation of the first lens unit and the second lens unit and the refractive power relation of the third lens unit and the fourth lens unit both corresponding to the above-described case (ii).

For this reason, the principal point interval (air separation) between the first lens unit and the second lens unit is made to shorten as zooming from the wide-angle end to the telephoto end, thereby increasing the magnification of a composite system of the first lens unit and the second lens unit, particularly the magnification of the second lens unit.

Also, the principal point interval between the third lens unit and the fourth lens unit, too, is made to shorten, thereby increasing the magnification of a composite system of the third lens unit and the fourth lens unit, particularly the magnification of the fourth lens unit.

In such a manner, the second lens unit and the fourth lens unit are configured both to increase their magnifications as zooming from the wide-angle end to the telephoto end, thus facilitating the increase of the range of focal lengths of the entire lens system. Particularly, with the use of a larger amount of variation of the magnification for the second lens unit than for the fourth lens unit, increasing of the zooming range is efficiently carried out. Further, in the present embodiment, the paraxial refractive power arrangement of the second lens unit and the third lens unit, if viewed in isolation, corresponds to the above-described case (i), as shown in FIGS. 1(A) and 1(B). Therefore, the principal point interval (air separation) between the second lens unit and the third lens unit is made to widen as zooming from the wide-angle end to the telephoto end. By making such a lens design, the composite system, regarded as an independent system, of the second lens unit and the third lens unit increases its magnification with zooming.

As has been described above, the present embodiment sets forth the rules of design for every one of the four lens units and the conditions for the zooming movement of each lens unit, thus making it possible for all of the second, third and fourth lens units to contribute to individual increases of the overall magnification. This leads to an advantage of extending the range of variation of the overall magnification of the whole lens system with a high efficiency.

In a specific embodiment of the invention, as zooming from the wide-angle end to the telephoto end, letting the amount of movement of the i-th lens group, when counted from the front, be denoted by Mi (movement toward the image side having a positive value) and the amount of variation of the focal length of the entire lens system be denoted by $\Delta f$, a great extension of the zooming range is achieved in such a way as to satisfy the following conditions:

$$0.3 < |M2/\oplus f| < 0.9 \qquad (1)$$

$$0.3 < |M4/\oplus f| < 0.9 \qquad (2)$$

When the amounts of movement of the second lens unit and the fourth lens unit are larger than the upper limits of the inequalities of conditions (1) and (2), the whole lens system is caused to increase in size. When the amounts of movement of the second lens unit and the fourth lens units are too little as exceeding the lower limits, as it implies that the amount of variation of the value of the principal point interval e in the above equation for the overall refractive power $\phi$ of the second and fourth lens units that contribute to most of the variation of the image magnification decreases, it becomes difficult to secure attainment of a predetermined zoom ratio. So, that is no good.

Another feature of the invention is that the amount of variation with zooming of the magnification of the second lens unit is made larger than the amount of variation of the magnification of the fourth lens unit. This produces an advantage of minimizing the size of the whole lens system while keeping the predetermined zoom ratio.

If, as opposed to the the invention, the amount of variation of the magnification of the fourth lens unit comes to be larger than the amount of variation of the magnification of the second lens unit, the effective diameter of the fourth lens unit increases largely, and the speed (F-number) for the telephoto side of the lens system comes to be objectionably slow (dark).

In the present embodiment, to obtain a high grade imagery over the entire area of the image frame, it is recommended that the individual lens units are constructed as follows:

The first lens unit has at least one negative lens and at least one positive lens. It is also good that an air lens of convex shape toward the object side is formed in the first lens unit.

The second lens unit has lenses of which at least the front two are positive. This is good from the point of view of good correction of, in particular, spherical aberration. It is also good that one of these two positive lenses is made up from a material whose Abbe number $\gamma_{2P}$ satisfies the following condition:

$$\gamma_{2P} > 50 \qquad (3)$$

When the inequality of condition (3) is violated, mainly the longitudinal chromatic aberration, when zooming, varies to an objectionably large extent.

A diaphragm is preferably arranged in an arbitrary position within the second lens unit on zooming to move in unison with the second lens unit from the point of view of aberration correction. The diaphragm may otherwise be positioned in between the second lens unit and the third lens unit and arranged on zooming to move independently of the second lens unit. In the latter case, there is an advantage of minimizing the variation of the F-number with zooming.

It is good to construct the fourth lens unit as having a positive lens whose rear surface is convex toward the image side, and at least on negative lens whose front surface is concave toward the object side.

It should be noted that in the invention, when zooming, the second lens unit and the fourth lens unit may be moved in unison. According to this, the complexity of structure of the operating mechanism is reduced advantageously.

Besides these, for the focal length fi of the i-th lens unit, the invention sets forth the following conditions:

$$1.5 < |f1/fw| < 2.5 \quad (4)$$
$$0.9 < f2/fw < 2 \quad (5)$$
$$1.8 < |f4/fw| < 3.5 \quad (6)$$

where fw is the shortest focal length of the entire lens system. When these conditions are satisfied, an advantage of minimizing the size of the whole lens system while securing an efficient increase of the zoom ratio to the predetermined value is produced.

When the refractive powers of these lens units are too weak as exceeding the upper limits of the conditions (4), (5) and (6), the required amount of movement for obtaining the predetermined zoom ratio of each lens unit increases largely, causing the size of the entire lens system to increase objectionably.

When the refractive power of the first lens unit is too strong as exceeding the lower limit of the condition (4), the use of the first lens unit in focusing results in a large variation of aberrations therewith.

When the refractive power of the second lens unit that performs the function of varying the image magnification is too strong as exceeding the lower limit of the condition (5), the Petzval sum increases in the positive direction, so that curvature of field is undercorrected over the entire zooming range. So, it should be avoided.

When the refractive power of the fourth lens unit is too strong as exceeding the lower limit of the condition (6), the Petzval sum, conversely to the condition (5), increases in the negative direction, so that curvature of field comes to be over-corrected over the entire zooming range. So, it should be avoided.

Also, in the present invention, particularly to the end of reducing the size of the entire lens system, it is recommended to design the refractive powers of all the lens units and the lens form so as to satisfy the following condition for the minimum value of the back focal distance bf·min in the entire zooming range:

$$0.13 < bf\cdot min/fw < 0.7 \quad (7)$$

When the upper limit of the condition (7) is exceeded, the whole lens system is caused to increase in size. When the lower limit is exceeded, the fourth lens unit is too close to the image plane to avoid appearance of an image of dust or the like on the photosensitive surface. So, that is no good.

In the invention, to well correct chiefly inward coma flare due to the lower marginal light rays and barrel type distortion on the wide-angle side, it is a good measure to apply an aspheric surface of such shape that the positive refractive power becomes progressively stronger, or the negative refractive power becomes progressively weaker, toward the margin of the lens to at least one lens surface of the first lens unit.

On the telephoto side, on the other hand, inward coma due to the upper marginal light rays can be corrected by forming at least one lens surface of the third lens unit or the fourth lens unit to such an aspheric shape that the positive refractive power becomes progressively weaker, or the negative refractive power becomes progressively stronger, toward the margin of the lens.

Focusing is carried out preferably by the first lens unit. Further, the fourth lens unit may be used for this purpose. Also, a particular region of the focusing range, for example, only a region of shortest distances, may be assigned to the fourth lens unit. According to this, it becomes possible to extend the focusing range toward shorter distances and to prevent the diameter of the front lens members from increasing. So, that is favorable.

Next, numerical examples 1 to 3 of the invention are shown below. In the numerical examples 1 to 3, Ri is the radius of curvature of the i-th lens surface, when counted from the front, Di is the i-th axial thickness or air separation, when counted from the front, and Ni and $\gamma i$ are respectively the refractive index and Abbe number of the glass of the i-th lens element, when counted from the front.

The values of the factors in the above-described conditions (1) to (7) for the numerical examples 1 to 3 are listed in Table-1.

NUMERICAL EXAMPLE 1

| Numerical Example 1 $F = 28.95\text{-}135.9 \quad FNO = 1{:}3.6\text{-}8.1 \quad 2\omega = 74°\text{-}18.1°$ | | | | |
|---|---|---|---|---|
| R1 = 92.43 | D1 = 4.62 | N1 = 1.69895 | $\nu 1$ = 30.1 |
| R2 = 348.33 | D2 = 0.18 | | |
| R3 = 40.72 | D3 = 1.80 | N2 = 1.83400 | $\nu 2$ = 37.2 |
| R4 = 28.22 | D4 = 7.68 | | |
| R5 = 1199.63 | D5 = 1.80 | N3 = 1.80610 | $\nu 3$ = 40.9 |
| R6 = 25.48 | D6 = 6.75 | | |
| R7 = 29.28 | D7 = 3.23 | N4 = 1.72825 | $\mu 4$ = 28.5 |
| R8 = 52.34 | D8 = Variable | | |
| R9 = 54.62 | D9 = 2.68 | N5 = 1.51633 | $\nu 5$ = 64.1 |
| R10 = −746.51 | D10 = 0.10 | | |
| R11 = 25.99 | D11 = 3.46 | N6 = 1.51633 | $\nu 6$ = 64.1 |
| R12 = 103.73 | D12 = 0.10 | | |
| R13 = 21.21 | D13 = 3.13 | N7 = 1.51633 | $\nu 7$ = 64.1 |
| R14 = 66.09 | D14 = 1.99 | | |
| R15 = (Stop) | D15 = 2.09 | | |
| R16 = −82.56 | D16 = 2.30 | N8 = 1.77258 | $\nu 8$ = 49.6 |
| R17 = −34.23 | D17 = 1.00 | N9 = 1.72342 | $\nu 9$ = 37.9 |
| R18 = 18.55 | D18 = 1.88 | | |
| R19 = 165.34 | D19 = 3.30 | N10 = 1.56384 | $\nu 10$ = 60.7 |
| R20 = −29.27 | D20 = Variable | | |
| R21 = 65.37 | D21 = 2.68 | N11 = 1.53172 | $\nu 11$ = 48.9 |
| R22 = −55.79 | D22 = 1.00 | N12 = 1.79952 | $\nu 12$ = 42.2 |
| R23 = −222.98 | D23 = Variable | | |
| R24 = 120.21 | D24 = 5.17 | N13 = 1.64769 | $\nu 13$ = 33.8 |
| R25 = −30.40 | D25 = 0.87 | | |
| R26 = −30.62 | D26 = 1.20 | N14 = 1.78590 | $\nu 14$ = 44.2 |
| R27 = −506.09 | D27 = 3.25 | | |
| R28 = −35.44 | D28 = 1.50 | N15 = 1.78590 | $\nu 15$ = 44.2 |
| R29 = −169.87 | | | |

Lens Separation During Zooming

| Lens Separations During Zooming | | | |
|---|---|---|---|
| | Focal Length | | |
| | 28.95 | 75.08 | 135.89 |
| D8 | 38.10 | 8.09 | 1.01 |
| D20 | 0.90 | 5.15 | 11.52 |
| D23 | 16.58 | 10.98 | 2.58 |

NUMERICAL EXAMPLE 2

Numerical Example 2
F = 28.80–136   FNO = 1:3.6–8.1   2ω = 74°–18.1°

| | | | | | | |
|---|---|---|---|---|---|---|
| R1 = | 93.04 | D1 = | 5.29 | N1 = | 1.64769 | ν1 = 33.8 |
| R2 = | 321.48 | D2 = | 0.18 | | | |
| R3 = | 40.50 | D3 = | 1.80 | N2 = | 1.80610 | ν2 = 40.9 |
| R4 = | 28.18 | D4 = | 9.25 | | | |
| R5 = | 946.05 | D5 = | 1.80 | N3 = | 1.78590 | ν3 = 44.2 |
| R6 = | 26.25 | D6 = | 6.42 | | | |
| R7 = | 29.70 | D7 = | 3.83 | N4 = | 1.68893 | ν4 = 31.1 |
| R8 = | 53.16 | D8 = | Variable | | | |
| R9 = | 53.25 | D9 = | 2.32 | N5 = | 1.51633 | ν5 = 64.1 |
| R10 = | 1346.96 | D10 = | 0.10 | | | |
| R11 = | 25.57 | D11 = | 3.84 | N6 = | 1.51633 | ν6 = 64.1 |
| R12 = | 137.49 | D12 = | 0.10 | | | |
| R13 = | 21.77 | D13 = | 3.71 | N7 = | 1.51633 | ν7 = 64.1 |
| R14 = | 64.43 | D14 = | 1.87 | | | |
| R15 = | (Stop) | D15 = | 1.85 | | | |
| R16 = | −79.86 | D16 = | 2.19 | N8 = | 1.80610 | ν8 = 40.9 |
| R17 = | −34.31 | D17 = | 1.00 | N9 = | 1.72342 | ν9 = 37.9 |
| R18 = | 18.50 | D18 = | 1.94 | | | |
| R19 = | 211.12 | D19 = | 3.30 | N10 = | 1.56384 | ν10 = 60.7 |
| R20 = | −29.81 | D20 = | Variable | | | |
| R21 = | 60.06 | D21 = | 2.13 | N11 = | 1.53172 | ν11 = 48.9 |
| R22 = | −62.32 | D22 = | 1.00 | N12 = | 1.83400 | ν12 = 37.2 |
| R23 = | −347.29 | D23 = | Variable | | | |
| R24 = | 127.97 | D24 = | 5.19 | N13 = | 1.63636 | ν13 = 35.4 |
| R25 = | −28.85 | D25 = | 0.92 | | | |
| R26 = | −30.06 | D26 = | 1.20 | N14 = | 1.78590 | ν14 = 44.2 |
| R27 = | −330.78 | D27 = | 4.01 | | | |
| R28 = | −36.44 | D28 = | 1.00 | N15 = | 1.77250 | ν15 = 49.6 |
| R29 = | −156.14 | | | | | |

Lens Separations During Zooming

| | Focal Length | | |
|---|---|---|---|
| | 28.80 | 74.55 | 136.00 |
| D8 | 40.92 | 9.00 | 1.00 |
| D20 | 1.01 | 6.13 | 13.81 |
| D23 | 16.34 | 10.41 | 1.50 |

NUMERICAL EXAMPLE 3

Numerical Example 3
F = 28.88–136.0   FNO = 1:3.6–8.1   2ω = 74°–18.1°

| | | | | | | |
|---|---|---|---|---|---|---|
| R1 = | 157.33 | D1 = | 1.84 | N1 = | 1.80610 | ν1 = 40.9 |
| R2 = | 25.25 | D2 = | 6.03 | | | |
| R3 = | 29.24 | D3 = | 4.79 | N2 = | 1.68893 | ν2 = 31.1 |
| R4 = | 53.09 | D4 = | Variable | | | |
| R5 = | 51.79 | D5 = | 2.36 | N3 = | 1.51633 | ν3 = 64.1 |
| R6 = | −763.30 | D6 = | 0.09 | | | |
| R7 = | 22.29 | D7 = | 2.74 | N4 = | 1.48749 | ν4 = 70.2 |
| R8 = | 53.46 | D8 = | 0.09 | | | |
| R9 = | 18.53 | D9 = | 3.22 | N5 = | 1.48749 | ν5 = 70.2 |
| R10 = | 53.83 | D10 = | 2.83 | | | |
| R11 = | (Stop) | D11 = | 2.04 | | | |
| R12 = | −2199.62 | D12 = | 1.26 | N6 = | 1.83400 | ν6 = 37.2 |
| R13 = | 15.97 | D13 = | 1.22 | | | |
| R14 = | 36.17 | D14 = | 2.98 | N7 = | 1.56384 | ν7 = 60.7 |
| R15 = | −55.70 | D15 = | Variable | | | |
| R16 = | 34.64 | D16 = | 2.88 | N8 = | 1.53172 | ν8 = 48.9 |
| R17 = | −32.42 | D17 = | 0.07 | | | |
| R18 = | −41.65 | D18 = | 0.77 | N9 = | 1.80610 | ν9 = 40.9 |
| R19 = | 113.33 | D19 = | Variable | | | |
| R20 = | 161.11 | D20 = | 3.63 | N10 = | 1.64769 | ν10 = 33.8 |
| R21 = | −32.76 | D21 = | 3.91 | | | |
| R22 = | −22.67 | D22 = | 1.34 | N11 = | 1.71299 | ν11 = 53.8 |
| R23 = | −94.10 | D23 = | 0.60 | | | |
| R24 = | −61.20 | D24 = | 1.67 | N12 = | 1.69680 | ν12 = 55.5 |
| R25 = | 70.58 | | | | | |

Lens Separations During Zooming

| | Focal Length | | |
|---|---|---|---|
| | 28.89 | 73.80 | 135.99 |
| D4 | 51.68 | 13.34 | 1.01 |
| D15 | 1.01 | 3.70 | 0.98 |
| D19 | 12.56 | 3.56 | 0.95 |

TABLE 1

| Condition No. | Factor | Numerical Example | | |
|---|---|---|---|---|
| | | 1 | 2 | 3 |
| (1) | \|M2/Δf\| | 0.69 | 0.70 | 0.53 |
| (2) | \|M4/Δf\| | 0.72 | 0.71 | 0.64 |
| (3) | ν2p | 64.2 | 64.2 | 64.2 |
| (4) | \|f1/fw\| | 1.75 | 1.79 | 2.41 |
| (5) | f2/fw | 1.38 | 1.41 | 1.45 |
| (6) | \|f4/fw\| | 2.58 | 3.04 | 2.03 |
| (7) | bf·min/fw | 0.284 | 0.295 | 0.28 |

Figures 8A, 8B:
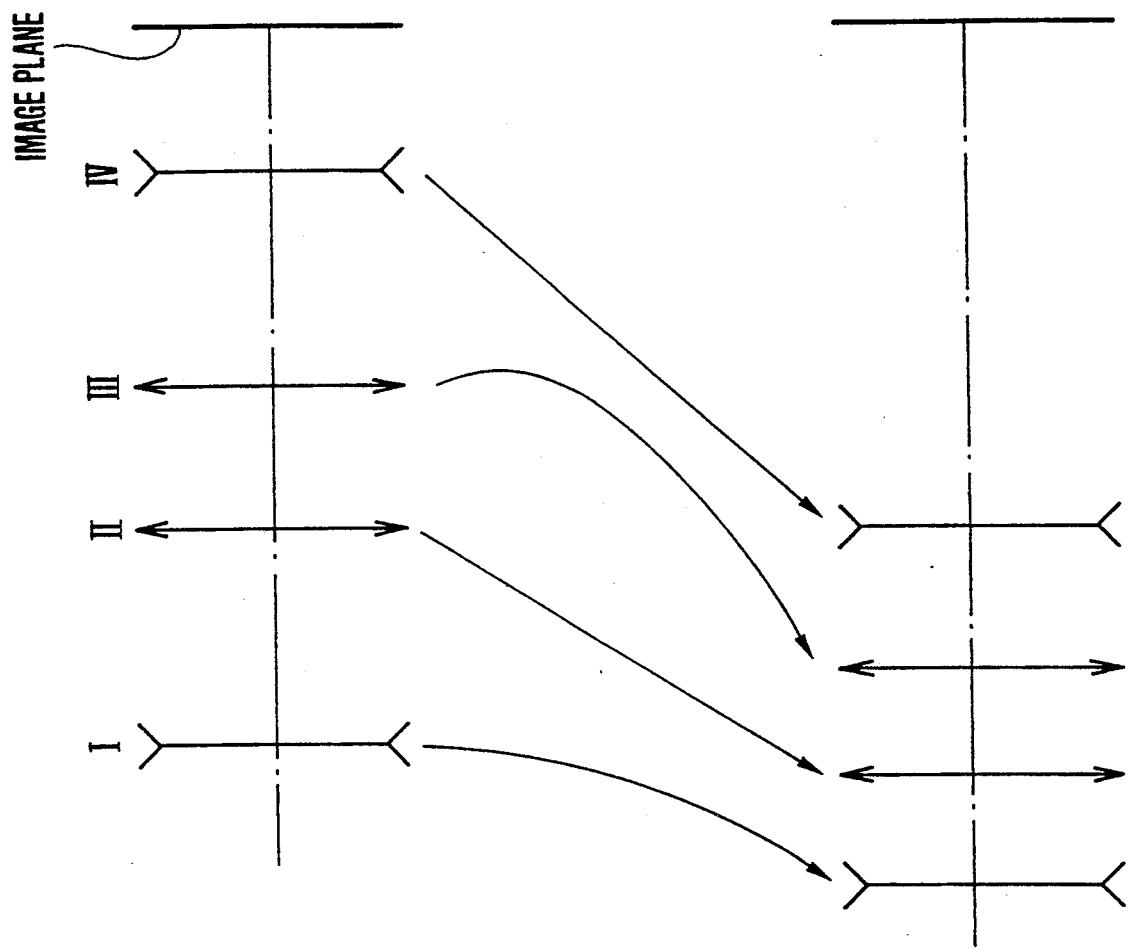
Figure 9A:
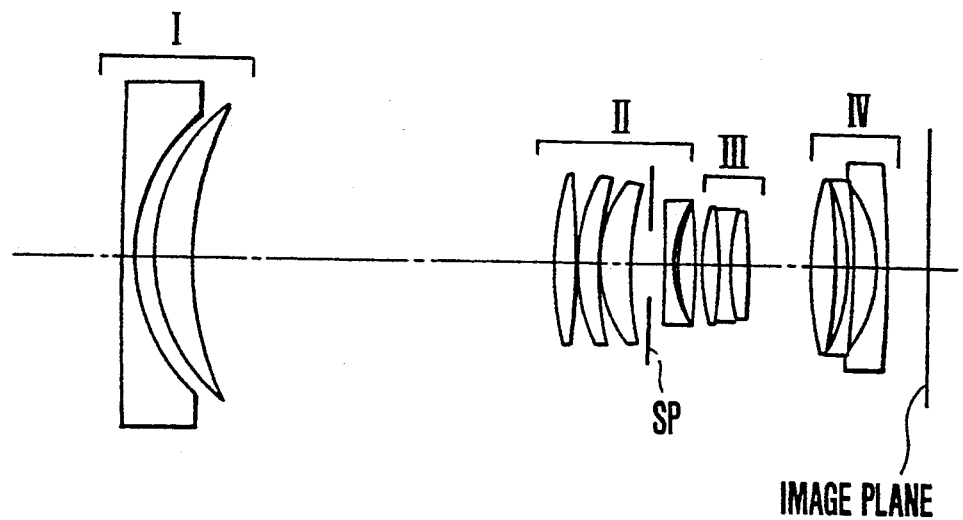
Figure 9B:
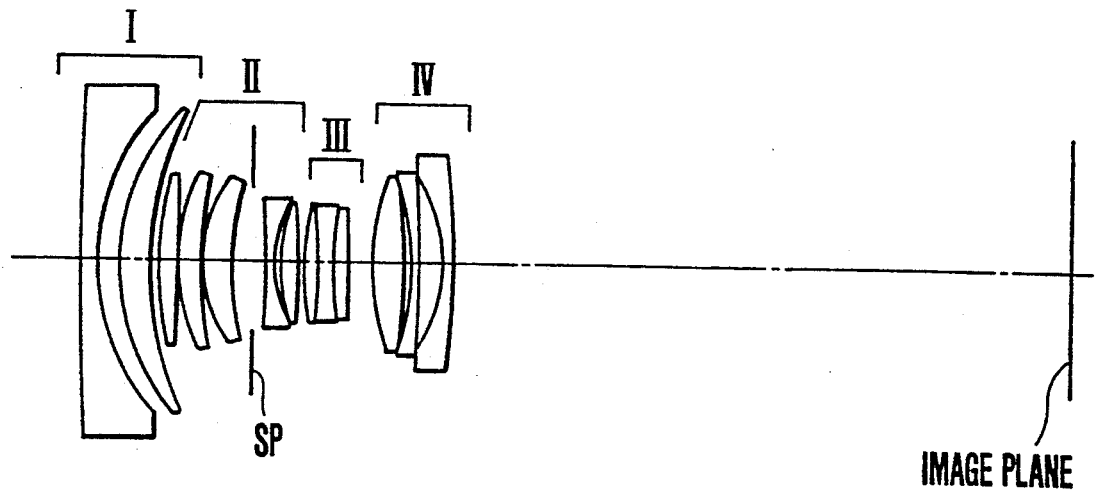
Figure 10A:
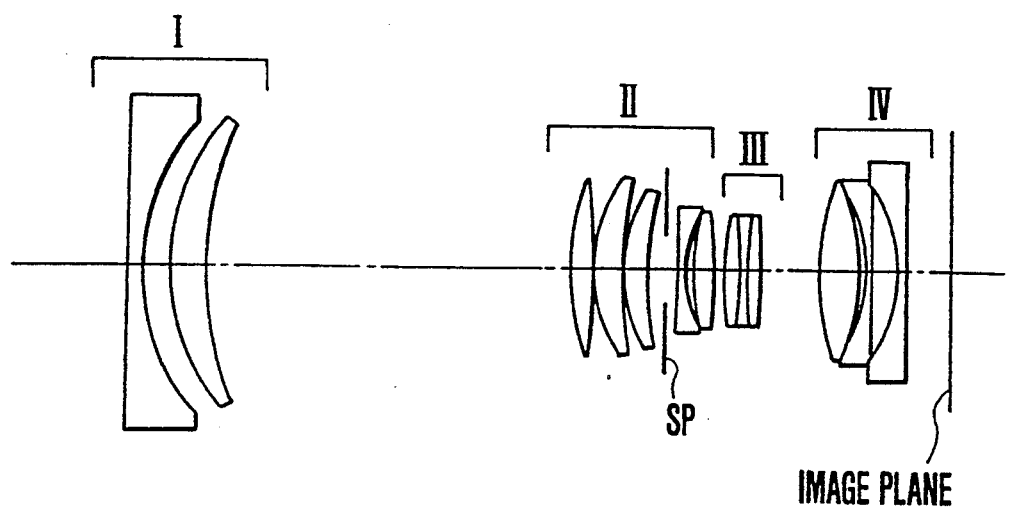
Figure 10B:
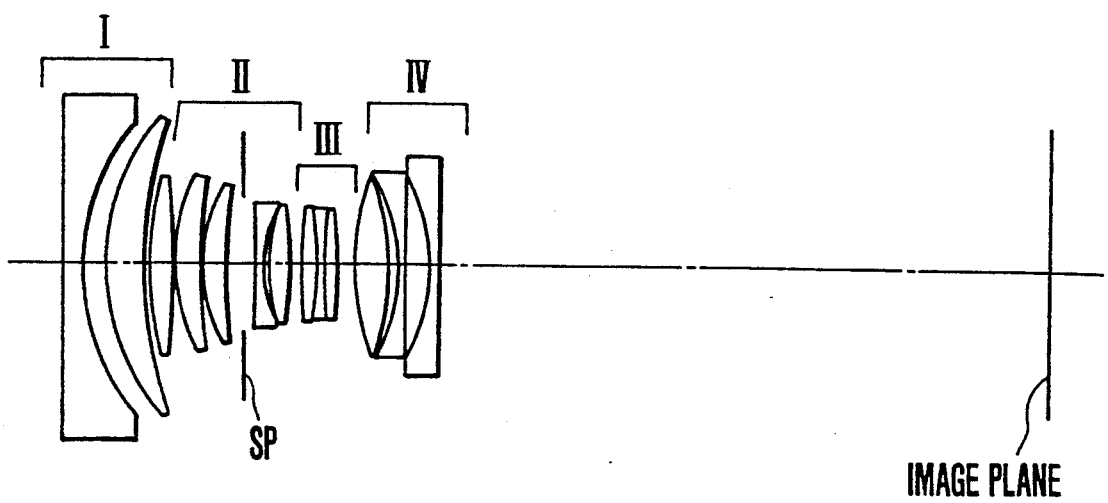
Figure 11A:
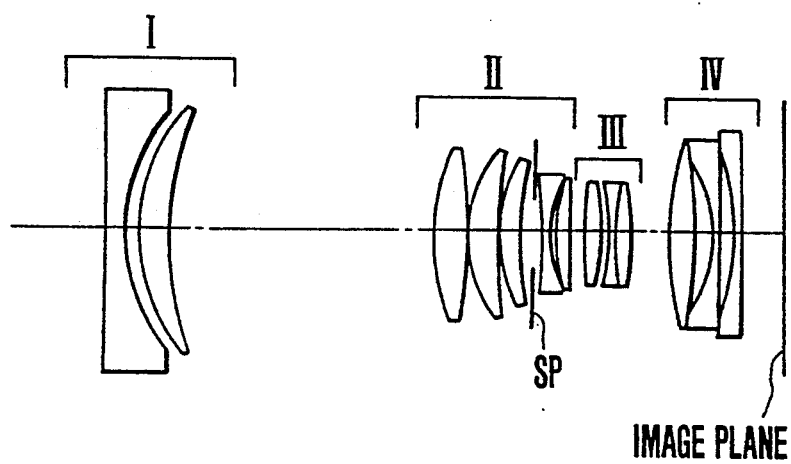
Figure 11B:
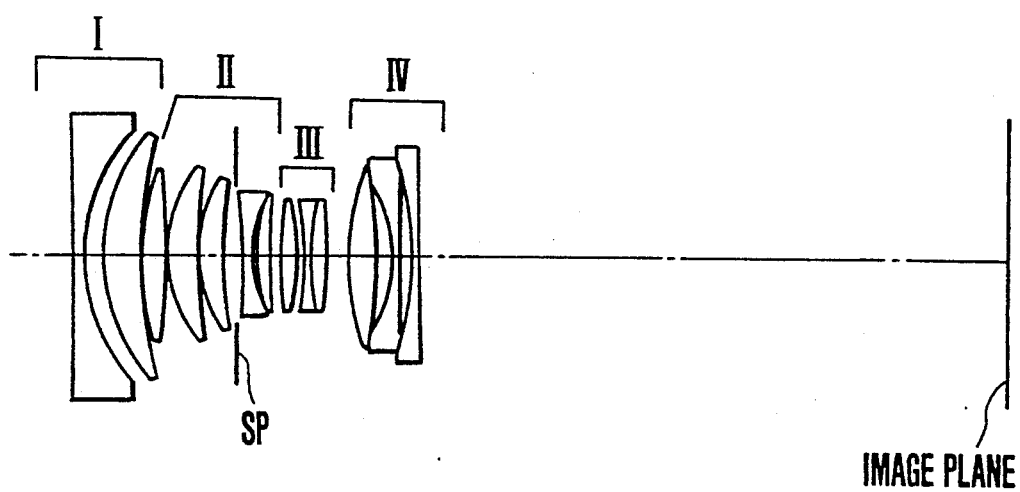
Figure 12A:
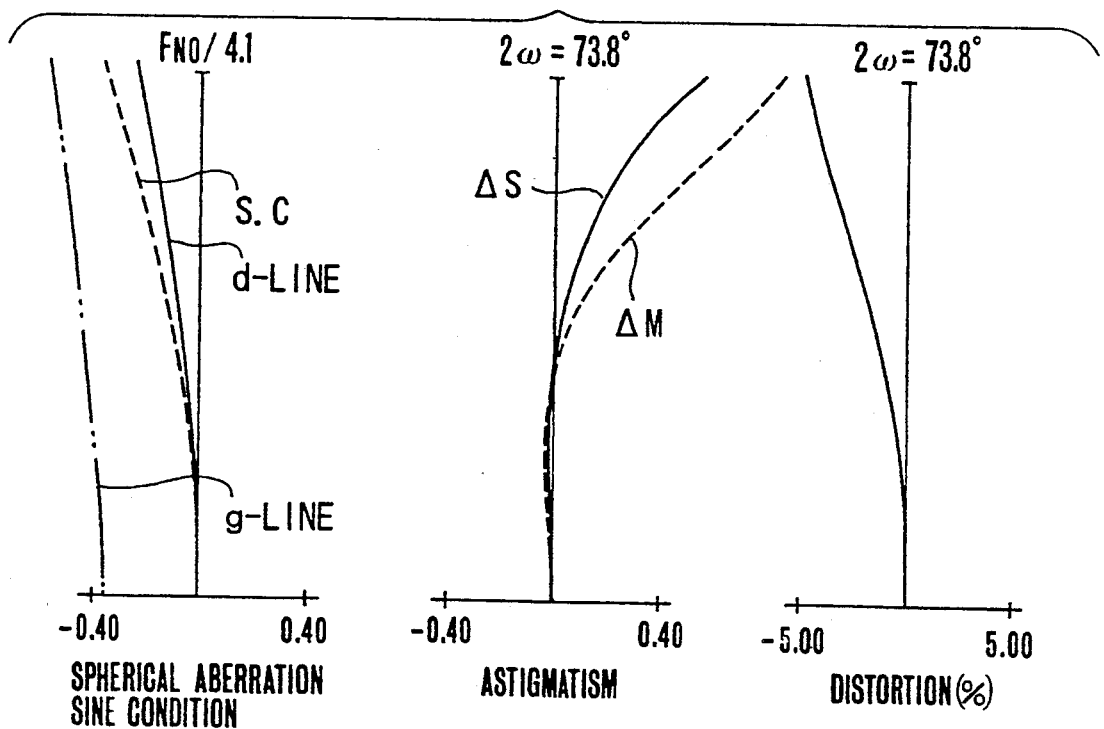
Figure 12B:
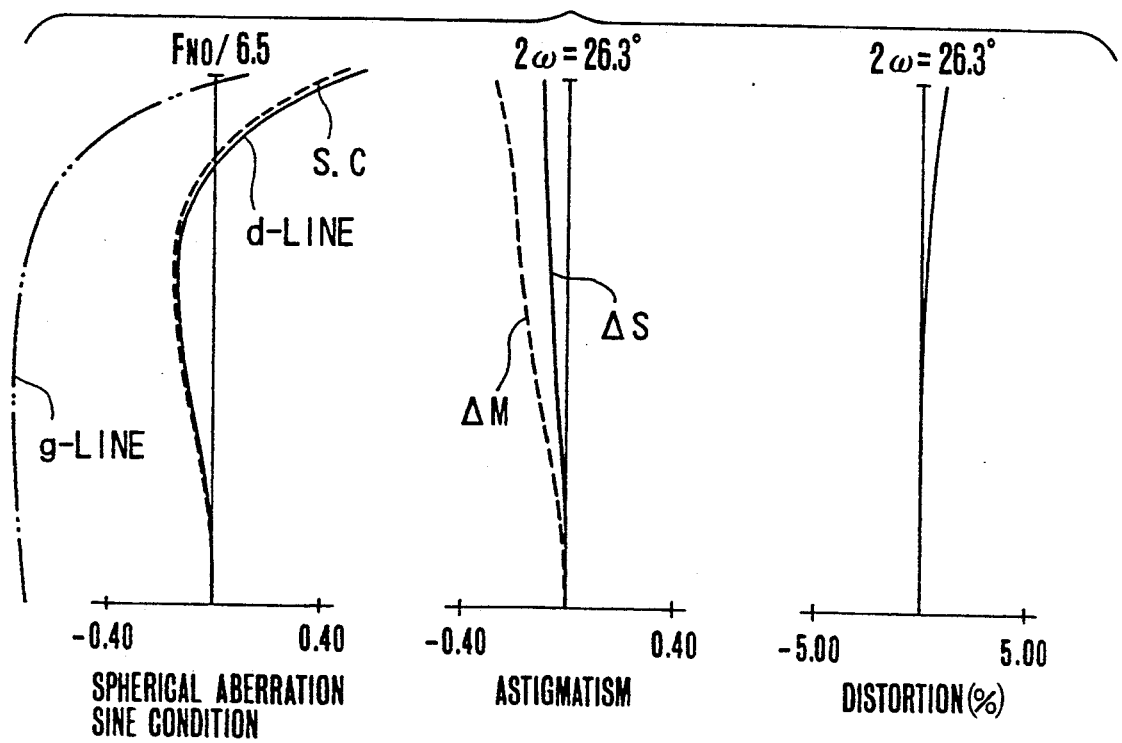
Figure 12C:
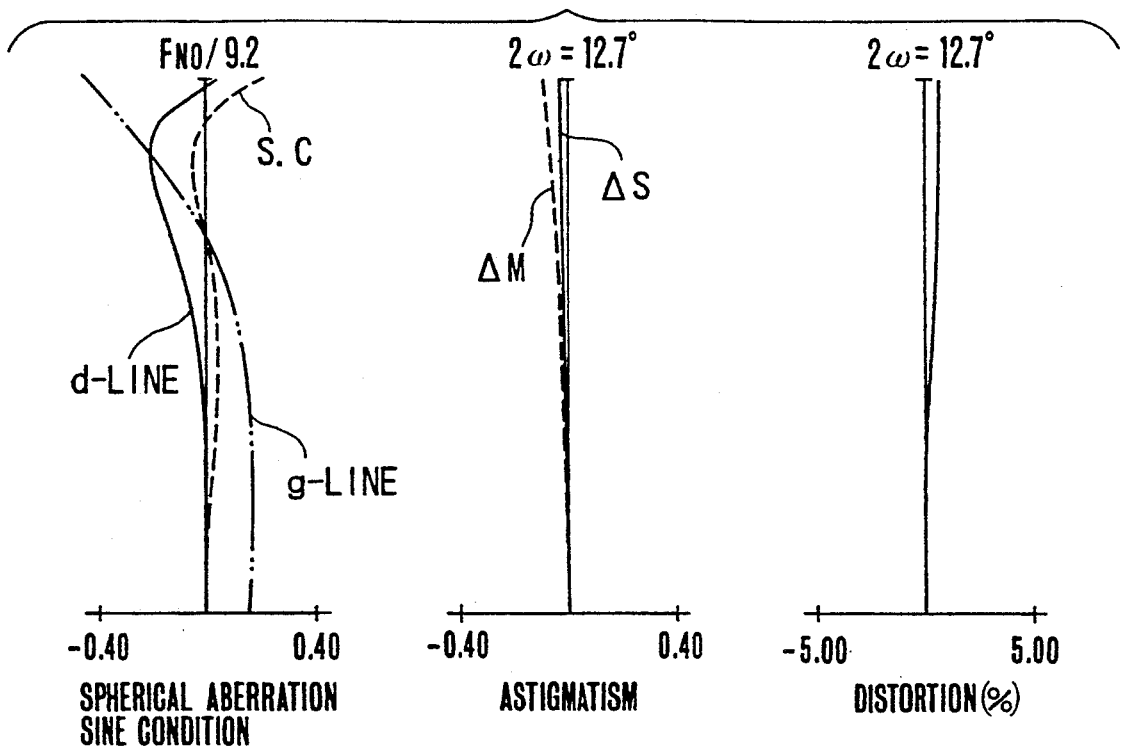
Figure 13A:
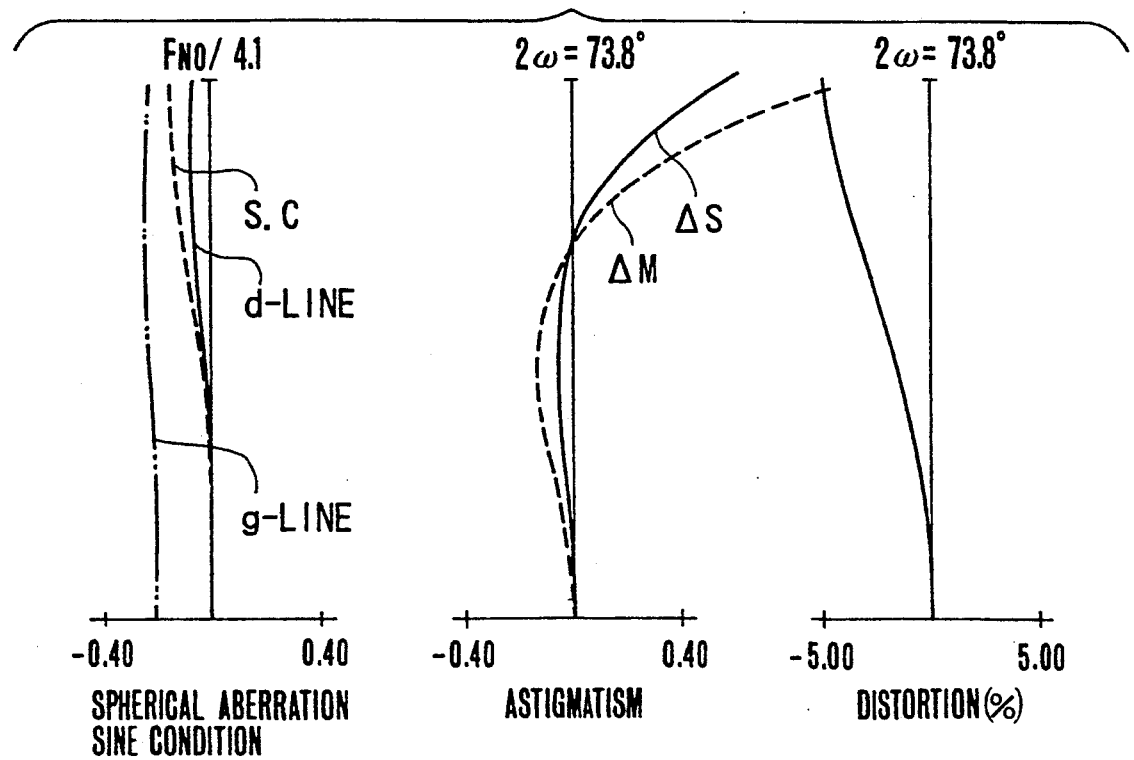
Figure 13B:
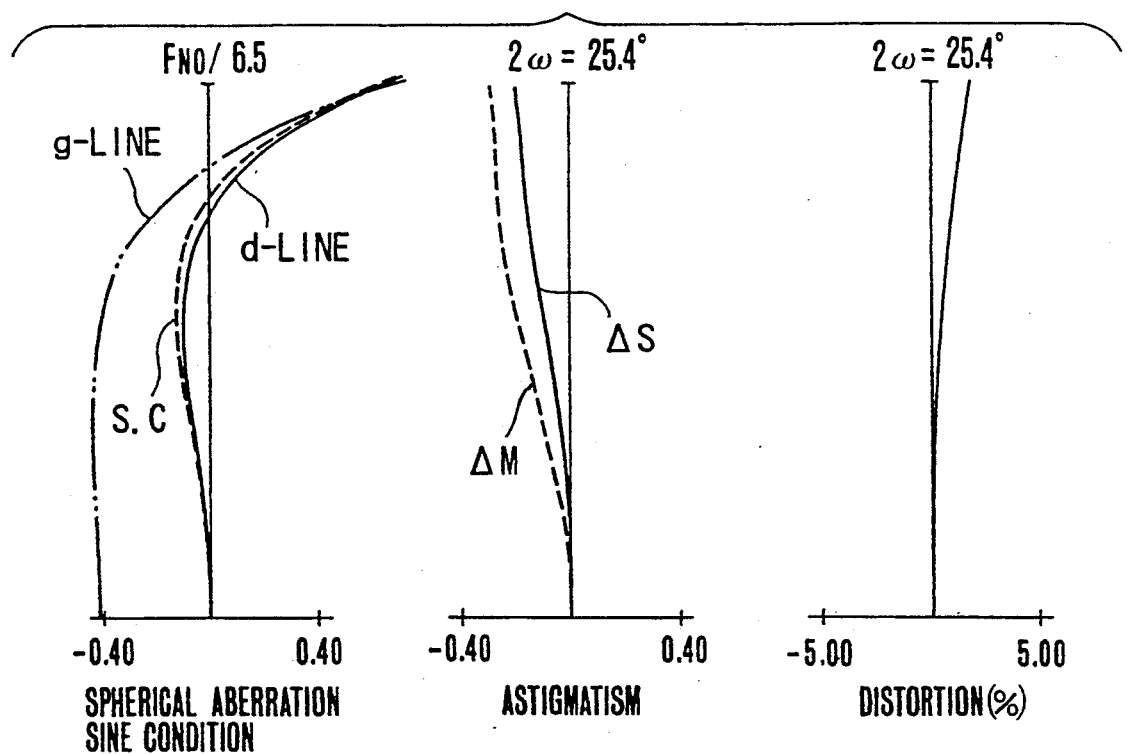
Figure 13C:
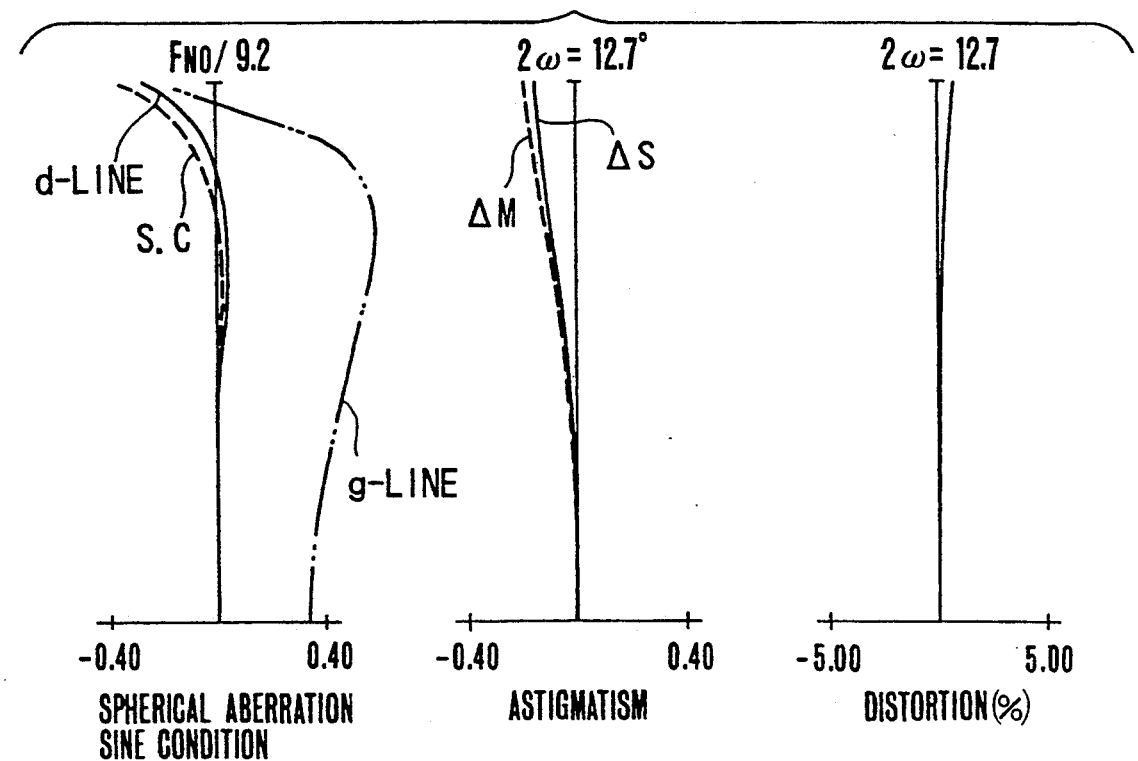
Figure 14A:
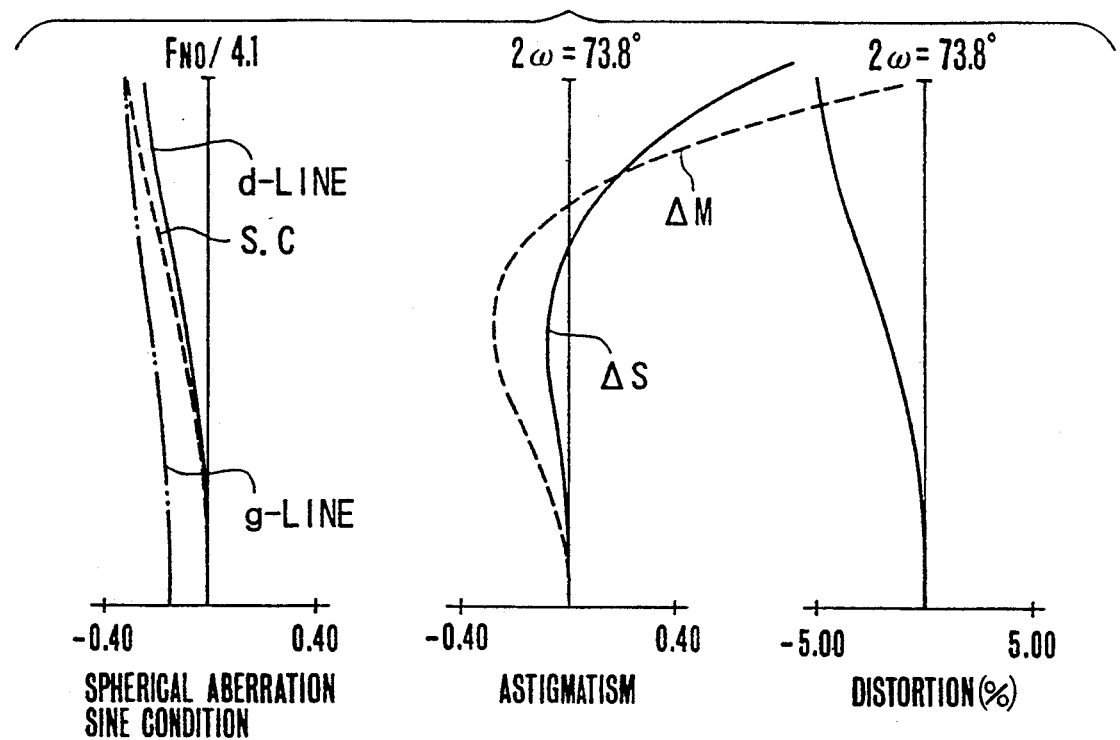
Figure 14B:
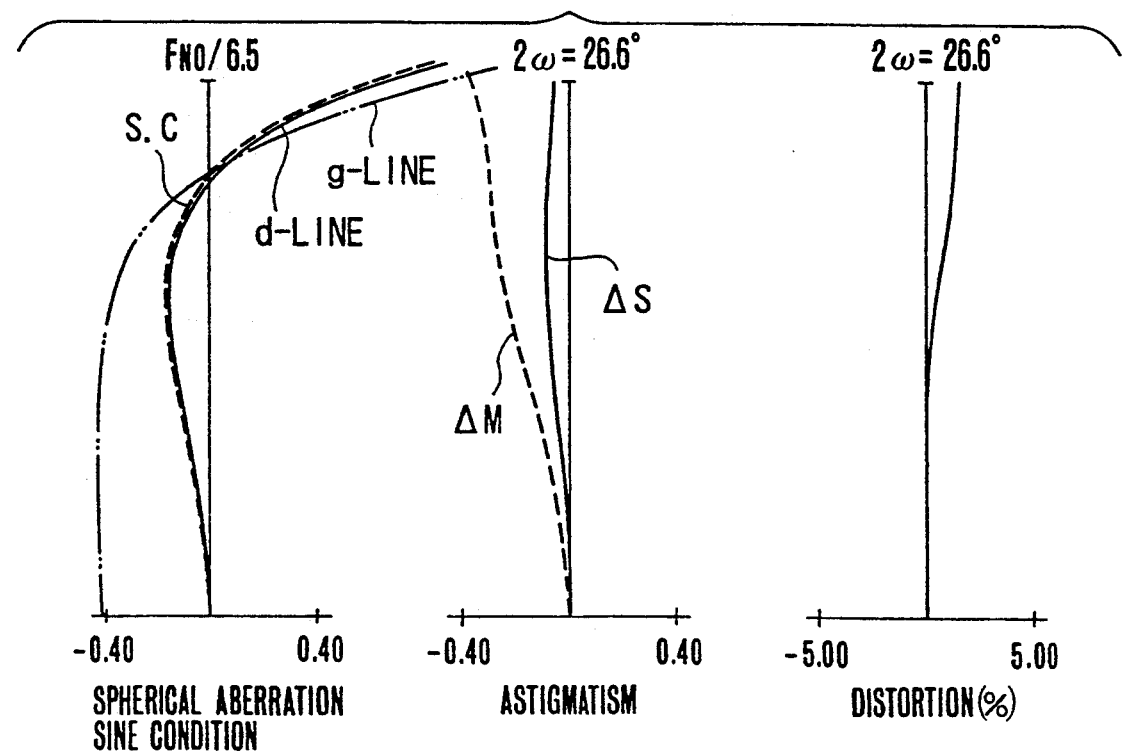
Figure 14C:
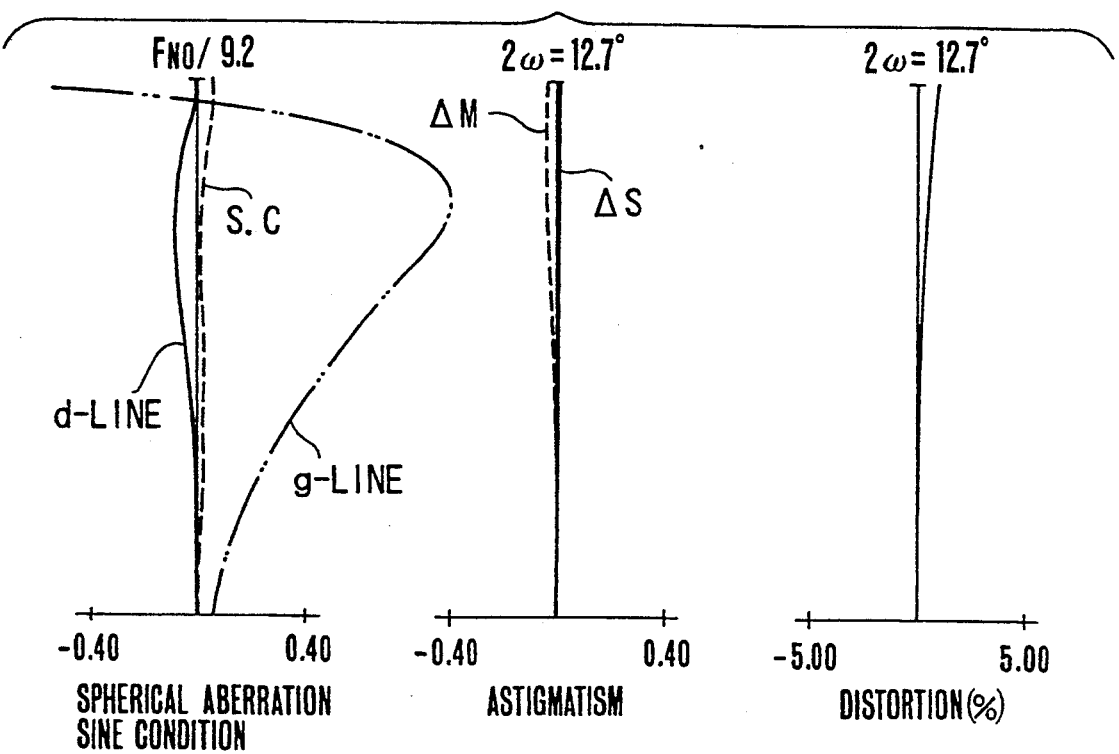

Whilst, in the foregoing embodiment, the zoom lenses whose zoom ratio is about 5 have been disclosed, zoom lenses having a zoom ratio of about 7 are shown below. In order to let a zoom lens have so high a zoom ratio, it is preferred to set forth conditions as follows. Referring to FIGS. 8(A) and 8(B) and those that follow, the zoom lens is made constructed as comprising, from front to rear, a first lens unit of negative refractive power, a second lens unit of positive refractive power, a third lens unit of positive refractive power and a fourth lens unit of negative refractive power. As zooming from the wide-angle end to the telephoto end, the second lens unit and the fourth lens unit moves toward the object side, the separation between the first lens unit and the second lens unit getting shortest in the telephoto end, and the third lens unit moves to keep constant the position of an image plane against zooming. Letting the distance from the front vertex of the second lens unit to the front principal point of the second lens unit be denoted by O2 (taken positive when measuring toward the image side, negative when measuring toward the object side) and the focal length of the second lens unit by f2, the following condition is satisfied:

$$-1.25 < O2/f2 < -0.18 \tag{8}$$

Other features which are particularly preferable are that as zooming from the wide-angle end to the telephoto end, the second lens unit and the fourth lens unit linearly move forward independently of each other, and the third lens unit moves along a locus convex toward the image side, and that as zooming from the wide-angle end to the telephoto end, the first lens unit non-linearly moves forward.

The inequalities of condition (8) are for simultaneously fulfilling the requirements of reducing the size of the zoom lens and of increasing the zoom ratio. When the lower limit of the condition (8) is exceeded, the total length of the lens becomes long, and the diameter of the front lens members comes to increase. So, that is no good. When the upper limit is exceeded, the range of movement of the second lens unit by zooming becomes narrow, and it becomes difficult to obtain as high a zoom ratio as 7 or thereabout.

Also, the curvature of field in the intermediate zooming position is efficiently prevented from increasing in the negative direction, as is usual in the prior art when a refractive power arrangement similar to that of the invention is employed. During the time when zooming goes from the intermediate position to the telephoto end, the air separation between the second lens unit and the third lens unit narrows. By this, mainly the zooming-dependent variation of aberrations is corrected well. Further, the shift of the image plane with zooming is compensated for.

It is to be noted that specific examples to be described later, too, are made to satisfy the conditions (1), (2) and (3) described before, so that the much-desired increase of the zoom ratio is attained in such a manner as to preserve good optical performance. It is also to be noted that the second lens unit has at least one negative lens, wherein letting the refractive index of this negative lens be denoted by $N_{2n}$, it is desirable to choose a material satisfying the following condition:

$$1.75 < N_{2n} \tag{a}$$

When the inequality of condition (a) is violated, the Petzval sum increases in the negative direction, so that the curvature of field comes to be over-corrected. Particularly in the present embodiment, it is preferable to set forth conditions for the Abbe number $\gamma_{2p}$ of the material of the aforesaid positive lens in the second lens unit and the refractive index $N_{2n}$ of the negative lens in the second lens unit as follows:

$$60 < \gamma_{2p} \tag{b}$$

$$1.8 < N_{2n} \tag{c}$$

Further, the negative lens is made desirably to take its place adjacent to a diaphragm arranged in the second lens unit.

In the present embodiment, instead of putting the diaphragm into the lens system of the second lens unit, it may be arranged in the space between the second lens unit and the third lens unit on zooming to move independently of the second lens unit. According to this, the variation of the F-number with zooming can be minimized. So, that is favorable.

It is good that the fourth lens unit is constructed so as to have at least one positive lens of convex curvature toward the image side and at least one negative lens of concave curvature toward the object side.

It is to be noted that in the invention, when zooming, the second lens unit and the fourth lens unit may be moved in unison. According to this, the lens barrel is simplified. So, that is favorable.

Besides these, in the invention, letting the focal length of the i-th lens unit be denoted by fi and the shortest focal length of the entire lens system by fw, the following conditions are set forth:

$$1.5 < |f1/fw| < 3.0 \tag{9}$$
$$0.9 < f2/fw < 2.5 \tag{10}$$

-continued
$$2 < |f4/fw| < 4.0 \tag{11}$$

When these conditions are satisfied, the efficient increase of the zoom ratio to the desired value is secured, while still permitting the minimization of the size of the entire lens system to be achieved.

When the refractive powers of these lens units are too weak as exceeding the upper limits of the conditions (9), (10) and (11), the required amount of movement for obtaining the desired zoom ratio of each lens unit has to increase, causing the size of the entire lens system to increase objectionably.

When the refractive power of the first lens unit is too strong as exceeding the lower limit of the condition (9), the use of the first lens unit in focusing results in a large variation of aberrations with focusing.

When the refractive power of the second lens unit which performs the function of varying the image magnification is too strong as exceeding the lower limit of the condition (10), the Petzval sum increases in the positive direction, so that the image surface is objectionably under-corrected throughout the entire zooming range.

When the refractive power of the fourth lens unit is too strong as exceeding the lower limit of the condition (11), the Petzval sum varies conversely to the condition (10), or increases in the negative direction, so that the image surface is objectionably over-corrected throughout the entire zooming range.

Also, in the invention, particularly to reduce the size of the whole lens system, it is recommended to design the refractive powers of all the lens units and the lens form in such a way as to satisfy the condition (7) described before.

Also, in the present embodiment, to well correct chiefly inward coma flare due to the lower marginal light rays and barrel type distortion on the wide-angle side, it is a good measure to apply an aspheric surface of such shape that the positive refractive power becomes progressively stronger toward the margin of the lens to at least one lens surface of the first lens unit.

To correct inward coma due to the upper marginal light rays on the telephoto side, on the other hand, it is a good measure to apply an aspheric surface of such shape that the positive refractive power becomes progressively weaker toward the margin of the lens to at least one lens surface of the third lens unit or the fourth lens unit.

Focusing is preferably performed by using the first lens unit. Further, the fourth lens unit or the third lens unit may be used instead. Also, for a particular region, for example, only shortest distances, the fourth lens unit or the third lens unit may selectively be adopted. According to this, close-up focusing becomes possible. Another advantage is that the diameter of the front lens members can be prevented from increasing.

It should be noted that in the present embodiment it is desirable in connection with the condition (8) to further satisfy the following condition:

$$-1.25 < O2/fw < -0.25 \tag{8-a}$$

When the lower limit of the condition (8)-a is exceeded, not only the total length increases, but also the diameter of the front lens members increases objectionably. When the upper limit is exceeded, the the range of movement for zooming of the second lens unit becomes so narrow that the zoom ratio of 7 or thereabout is difficult to obtain.

Next, numerical examples 4 to 6 of the invention are shown. In the numerical examples 4 to 6, Ri is the radius of curvature of the i-th lens surface, when counted from the front, Di is the i-th axial thickness or air separation, when counted from the front, and Ni and $\gamma$i are respectively the refractive index and Abbe number of the glass of the i-th lens element, when counted from the front.

The values of the factors in the above-described conditions for the numerical examples 4 to 6 are listed in Table-2.

NUMERICAL EXAMPLE 4

Numerical Example 4
$F = 28.8-194.0$  $FNO = 1:4.1-9.2$  $2\omega = 73.8°-12.7°$

| | | | | | | | |
|---|---|---|---|---|---|---|---|
| R1 = | 1102.99 | D1 = | 1.80 | N1 = | 1.77250 | $\nu$1 = | 49.6 |
| R2 = | 29.12 | D2 = | 3.98 | | | | |
| R3 = | 30.24 | D3 = | 5.50 | N2 = | 1.68893 | $\nu$2 = | 31.1 |
| R4 = | 50.89 | D4 = | Variable | | | | |
| R5 = | 54.35 | D5 = | 2.96 | N3 = | 1.49700 | $\nu$3 = | 81.6 |
| R6 = | −267.62 | D6 = | 0.09 | | | | |
| R7 = | 26.69 | D7 = | 4.00 | N4 = | 1.48749 | $\nu$4 = | 70.2 |
| R8 = | 63.40 | D8 = | 0.09 | | | | |
| R9 = | 18.39 | D9 = | 4.72 | N5 = | 1.48749 | $\nu$5 = | 70.2 |
| R10 = | 48.06 | D10 = | 3.30 | | | | |
| R11 = | (Stop) | D11 = | 2.52 | | | | |
| R12 = | −703.30 | D12 = | 1.26 | N6 = | 1.83400 | $\nu$6 = | 37.2 |
| R13 = | 16.78 | D13 = | 1.18 | | | | |
| R14 = | 24.12 | D14 = | 2.83 | N7 = | 1.48749 | $\nu$7 = | 70.2 |
| R15 = | −123.77 | D15 = | Variable | | | | |
| R16 = | 49.06 | D16 = | 2.50 | N8 = | 1.53172 | $\nu$8 = | 48.9 |
| R17 = | −61.27 | D17 = | 0.07 | | | | |
| R18 = | −107.95 | D18 = | 2.03 | N9 = | 1.78590 | $\nu$9 = | 44.2 |
| R19 = | 59.74 | D19 = | 0.32 | | | | |
| R20 = | 111.87 | D20 = | 1.97 | N10 = | 1.56732 | $\nu$10 = | 42.8 |
| R21 = | −621.42 | D21 = | Variable | | | | |
| R22 = | 45.30 | D22 = | 3.86 | N11 = | 1.68893 | $\nu$11 = | 31.1 |
| R23 = | −105.41 | D23 = | 1.31 | | | | |
| R24 = | −40.69 | D24 = | 1.34 | N12 = | 1.71299 | $\nu$12 = | 53.8 |
| R25 = | −127.98 | D25 = | 3.70 | | | | |
| R26 = | −21.73 | D26 = | 1.67 | N13 = | 1.69680 | $\nu$13 = | 55.5 |
| R27 = | −135.01 | | | | | | |

Lens Separations During Zooming

| | Lens Separations During Zooming | | |
|---|---|---|---|
| | Focal Length | | |
| | W 28.80 | M 92.57 | T 194.00 |
| D4 | 57.32 | 13.75 | 1.09 |
| D15 | 0.72 | 5.24 | 1.00 |
| D21 | 10.33 | 1.25 | 4.29 |

NUMERICAL EXAMPLE 5

Numerical Example 5
$F = 28.8-194.0$  $FNO = 1:4.1-9.2$  $2\omega = 73.8°-12.7°$

| | | | | | | | |
|---|---|---|---|---|---|---|---|
| R1 = | −1588.68 | D1 = | 1.80 | N1 = | 1.77250 | $\nu$1 = | 49.6 |
| R2 = | 29.62 | D2 = | 4.76 | | | | |
| R3 = | 31.37 | D3 = | 5.49 | N2 = | 1.68893 | $\nu$2 = | 31.1 |
| R4 = | 55.84 | D4 = | Variable | | | | |
| R5 = | 41.15 | D5 = | 3.46 | N3 = | 1.48749 | $\nu$3 = | 70.2 |
| R6 = | −422.32 | D6 = | 0.09 | | | | |
| R7 = | 22.09 | D7 = | 5.07 | N4 = | 1.51633 | $\nu$4 = | 64.1 |
| R8 = | 81.17 | D8 = | 0.09 | | | | |
| R9 = | 22.71 | D9 = | 3.57 | N5 = | 1.51633 | $\nu$5 = | 64.1 |
| R10 = | 53.49 | D10 = | 3.39 | | | | |
| R11 = | (Stop) | D11 = | 1.94 | | | | |
| R12 = | −171.87 | D12 = | 1.39 | N6 = | 2.02244 | $\nu$6 = | 29.1 |
| R13 = | 17.97 | D13 = | 0.91 | | | | |
| R14 = | 24.83 | D14 = | 2.98 | N7 = | 1.56732 | $\nu$7 = | 42.8 |
| R15 = | −123.12 | D15 = | Variable | | | | |
| R16 = | 153.86 | D16 = | 2.24 | N8 = | 1.51742 | $\nu$8 = | 52.4 |
| R17 = | −42.13 | D17 = | 0.11 | | | | |
| R18 = | −60.28 | D18 = | 0.78 | N9 = | 1.78590 | $\nu$9 = | 44.2 |
| R19 = | 86.88 | D19 = | 0.44 | | | | |
| R20 = | 97.24 | D20 = | 1.77 | N10 = | 1.56732 | $\nu$10 = | 42.8 |
| R21 = | −221.80 | D21 = | Variable | | | | |
| R22 = | 40.51 | D22 = | 5.66 | N11 = | 1.68893 | $\nu$11 = | 31.1 |
| R23 = | −35.72 | D23 = | 0.99 | | | | |
| R24 = | −26.42 | D24 = | 1.34 | N12 = | 1.71299 | $\nu$12 = | 53.8 |
| R25 = | −193.52 | D25 = | 3.77 | | | | |
| R26 = | −23.84 | D26 = | 1.67 | N13 = | 1.69680 | $\nu$13 = | 55.5 |
| R27 = | −400.66 | | | | | | |

Lens Separation During Zooming

| | Lens Separations During Zooming | | |
|---|---|---|---|
| | Focal length | | |
| | W 28.80 | M 95.78 | T 194.00 |
| D4 | 57.89 | 11.70 | 0.98 |
| D15 | 2.06 | 5.68 | 2.39 |
| D21 | 9.51 | 1.52 | 3.10 |

NUMERICAL EXAMPLE 6

Numerical Example 6
$F = 28.8-194.0$  $FNO = 1:4.1-9.2$  $2\omega = 73.8°-12.7°$

| | | | | | | | |
|---|---|---|---|---|---|---|---|
| R1 = | −555.76 | D1 = | 1.47 | N1 = | 1.80400 | $\nu$1 = | 46.6 |
| R2 = | 26.88 | D2 = | 3.20 | | | | |
| R3 = | 29.16 | D3 = | 4.20 | N2 = | 1.80518 | $\nu$2 = | 25.4 |
| R4 = | 50.39 | D4 = | Variable | | | | |
| R5 = | 34.65 | D5 = | 4.04 | N3 = | 1.48749 | $\nu$3 = | 70.2 |
| R6 = | −180.30 | D6 = | 0.07 | | | | |
| R7 = | 18.88 | D7 = | 5.26 | N4 = | 1.48749 | $\nu$4 = | 70.2 |
| R8 = | 89.22 | D8 = | 0.07 | | | | |
| R9 = | 19.87 | D9 = | 3.68 | N5 = | 1.51633 | $\nu$5 = | 64.1 |
| R10 = | 52.82 | D10 = | 2.38 | | | | |
| R11 = | (Stop) | D11 = | 0.92 | | | | |
| R12 = | −145.45 | D12 = | 1.11 | N6 = | 2.02244 | $\nu$6 = | 29.1 |
| R13 = | 15.36 | D13 = | 1.10 | | | | |
| R14 = | 23.41 | D14 = | 2.30 | N7 = | 1.51454 | $\nu$7 = | 54.7 |
| R15 = | 121.66 | D15 = | Variable | | | | |
| R16 = | 117.94 | D16 = | 2.58 | N8 = | 1.58144 | $\nu$8 = | 40.8 |
| R17 = | −30.58 | D17 = | 1.17 | | | | |
| R18 = | −39.14 | D18 = | 0.67 | N9 = | 1.77250 | $\nu$9 = | 49.6 |
| R19 = | 74.29 | D19 = | 0.13 | | | | |
| R20 = | 51.54 | D20 = | 2.35 | N10 = | 1.58144 | $\nu$10 = | 40.8 |
| R21 = | −74.41 | D21 = | Variable | | | | |
| R22 = | 41.01 | D22 = | 4.13 | N11 = | 1.72825 | $\nu$11 = | 28.5 |
| R23 = | −87.39 | D23 = | 2.94 | | | | |
| R24 = | −22.38 | D24 = | 1.07 | N12 = | 1.71299 | $\nu$12 = | 53.8 |
| R25 = | −257.20 | D25 = | 1.92 | | | | |
| R26 = | −44.10 | D26 = | 1.34 | N13 = | 1.69680 | $\nu$13 = | 55.5 |
| R27 = | −739.08 | | | | | | |

Lens Separations During Zooming

| | Lens Separations During Zooming | | |
|---|---|---|---|
| | Focal length | | |
| | W 28.80 | M 91.69 | T 194.00 |
| D4 | 43.10 | 10.32 | 0.94 |
| D15 | 2.96 | 4.78 | 1.80 |
| D21 | 6.65 | 1.41 | 3.73 |

TABLE 2

| Condition No. | Factor | Numerical Example | | |
|---|---|---|---|---|
| | | 4 | 5 | 6 |
| (8) | O2/f2 | −0.2522 | −0.3302 | −0.4813 |
| (1) | $|M_2/\Delta f|$ | 0.512 | 0.504 | 0.512 |
| (2) | $|M_4/\Delta f|$ | 0.548 | 0.547 | 0.548 |
| (3) | $\nu_{2p}$ min | 70.21 | 64.15 | 64.15 |
| (9) | $|f_1/fw|$ | 2.218 | 2.196 | 1.865 |
| (10) | f2/fw | 1.446 | 1.396 | 1.347 |
| (11) | $|f_4/fw|$ | 2.538 | 3.752 | 2.668 |
| (7) | bf·min/fw | 0.246 | 0.243 | 0.243 |
| (8)-a | O2/fw | −0.365 | −0.461 | −0.648 |

According to the present invention, in the zoom lens comprising four lens units of prescribed refractive powers, by setting forth the conditions for the zooming movements of the lens units and the rules of design for the constituent lenses as described before, it is made possible to achieve a great increase of the zoom ratio to 5–7 or thereabout, while still permitting the total length of the lens to be shortened and a high optical performance to be maintained throughout the entire zooming range.

What is claimed is:

1. A zoom lens comprising:
   from front to rear,
   a first lens unit having a negative refractive power;
   a second lens unit having a positive refractive power;
   a third lens unit having a positive refractive power; and
   a fourth lens unit having a negative refractive power;
   wherein zooming from the wide-angle end to the telephoto end is performed by having at least said second and fourth lens unit toward the object side in such a way that a separation between said first lens unit and said second lens unit and a separation between said third lens unit and said fourth lens unit are shorter in the telephoto end than in the wide-angle end wherein, further, said second and fourth lens units also are moved in such a way that the magnifications of said second lens unit and said fourth lens unit increase, and the amount of variation of the magnification for said second lens unit is larger than that for said fourth lens unit.

2. A zoom lens according to claim 1, satisfying the following conditions:

$$0.3 < |M_2/\Delta f| < 0.9$$

$$0.3 < |M_4/\Delta f| < 0.9$$

where $M_2$ and $M_4$ are the amounts of movement of said second and fourth lens units respectively with zooming from the wide-angle end to the telephoto end, and $\Delta f$ is the amount of variation of the focal length of the entire lens system.

3. A zoom lens according to claim 2, satisfying the following conditions:

$$1.5 < |f_1/fw| < 2.5$$
$$0.9 < f_2/fw < 2$$
$$1.8 < |f_4/fw| < 3.8$$

where $f_1$, $f_2$ and $f_4$ are the focal lengths of said first lens unit, said second lens unit and said fourth lens unit respectively, and fw is the shortest focal length of the entire lens system.

4. A zoom lens according to claim 1, satisfying the following condition:

$$0.13 < bf\cdot min/fw < 0.7$$

where bf·min is the minimum of the back focal distance in the entire zooming range, and fw is the shortest focal length of the entire lens system.

5. A zoom lens according to claim 1, satisfying the following condition:

$$-1.25 < O2/f2 < -0.18$$

where O2 is the distance from a first lens surface of said second lens unit to a front principal point of said second lens unit (taken positive when measuring to the image side, or negative when measuring to the object side), and f2 is the focal length of said second lens unit.

6. A zoom lens according to claim 5, wherein said third lens unit moves so as to depict a locus convex toward the image side with zooming.

7. A zoom lens comprising:
   from front to rear,
   a first lens unit having a negative refractive power;
   a second lens unit having a positive refractive power;
   a third lens unit having a positive refractive power; and
   a fourth lens unit having a negative refractive power,
   wherein zooming from the wide-angle end to the telephoto end is performed by moving at least said second and fourth lens units toward the object side, and wherein the amount of variation of the magnification of said second lens unit is larger than that of said fourth lens unit.

8. A zoom lens according to claim 7, wherein a separation between said first lens unit and said second lens unit and a separation between said third lens unit and said fourth lens unit are shorter in the telephoto end than in the wide-angle end.

9. A zoom lens according to claim 7, satisfying the following conditions:

$$0.3 < |M_2/\Delta f| < 0.9$$

$$0.3 < |M_4/\Delta f| < 0.9$$

where $M_2$ and $M_4$ are the amounts of movement of said second and fourth lens units respectively with zooming from the wide-angle end to the telephoto end, and $\Delta f$ is the amount of variation of the focal length of the entire lens system.

10. A zoom lens according to claim 9, satisfying the following conditions:

$$1.5 < |f_1/fw| < 2.5$$
$$0.9 < f_2/fw < 2$$
$$1.8 < |f_4/fw| < 3.8$$

where $f_1$, $f_2$ and $f_4$ are the focal lengths of said first lens unit, said second lens unit and said fourth lens unit respectively, and fw is the shortest focal length of the entire lens system.

11. A zoom lens according to claim 7, satisfying the following condition:

$$0.13 < bf\cdot min/fw < 0.7$$

where bf·min is the minimum of the back focal distance in the entire zooming range, and fw is the shortest focal length of the entire lens system.

12. A zoom lens according to claim 7, satisfying the following condition:

$$-1.25 < O2/f2 < -0.18$$

where O2 is the distance from a first lens surface of said second lens unit to a front principal point of said second lens unit (taken positive when measuring to the image side, or negative when measuring to the object side), and f2 is the focal length of said second lens unit.

13. A zoom lens according to claim 12, wherein said third lens unit moves so as to depict a locus convex toward the image side with zooming.

14. A zoom lens comprising:
from front to rear,
a first lens unit having a negative refractive power;
a second lens unit having a positive refractive power;
a third lens unit having a positive refractive power; and
a fourth lens unit having a negative refractive power,
wherein zooming from the wide-angle end to the telephoto end is performed by moving at least said second and fourth lens units toward the object side in such a way that a separation between said first lens unit and said second lens unit and a separation between said third lens unit and said fourth lens unit are shorter in the telephoto end than in the wide-angle end, while satisfying the following conditions:

$$0.3 < |M_2/\Delta f| < 0.9$$

$$0.3 < |M_4/\Delta f| < 0.9$$

where $M_2$ and $M_4$ are the amounts of movement of said second and fourth lens units respectively with zooming from the wide-angle end to the telephoto end, and $\Delta f$ is the amount of variation of the focal length of the entire lens system.

15. A zoom lens according to claim 14, wherein zooming from the wide-angle end to the telephoto end is performed by moving said second and fourth lens units in such a way that the magnification of said second lens unit and said fourth lens unit increase, and wherein the amount of variation of the magnification of said second lens unit is larger than that of said fourth lens unit.

16. A zoom lens according to claim 14, satisfying the following conditions:

$$1.5 < |f_1/fw| < 2.5$$
$$0.9 < f_2/fw < 2$$
$$1.8 < |f_4/fw| < 3.8$$

where $f_1$, $f_2$ and $f_4$ are the focal lengths of said first lens unit, said second lens unit and said fourth lens unit respectively, and fw is the shortest focal length of the entire lens system.

17. A zoom lens according to claim 14, satisfying the following condition:

$$0.13 < bf\cdot min/fw < 0.7$$

where bf·min is the minimum of the back focal distance in the entire zooming range, and fw is the shortest focal length of the entire lens system.

* * * * *

UNITED STATES PATENT AND TRADEMARK OFFICE
CERTIFICATE OF CORRECTION

PATENT NO. : 5,111,338
DATED : May 5, 1992
INVENTOR(S) : HIROKI NAKAYAMA

Page 1 of 2

It is certified that error appears in the above-identified patent and that said Letters Patent is hereby corrected as shown below:

On the title page: Item

[30], insert --Jan. 19, 1991 [JP] Japan 3-019363--.

IN THE ABSTRACT:

line 2, [57]    "seconde" should read --second--.

Column 4:

Line 4, "$0.3 < |M2/\oplus f| < 0.9$" should read --$0.3 < |M2/\Delta f| < 0.9$--.

Line 6, "$0.3 < |M4/\oplus f| < 0.9$" should read --$0.3 < |M4/\Delta f| < 0.9$--.

Line 28, "the" (2nd occurrence) should be deleted.

Line 40, "least" should not be indented.

Line 41, "lens" should not be indented.

Line 42, "formed" should not be indented.

Line 51, "$v2P > 50$" should read --$v_{2P} > 50$--.

Line 60, "in between" should read --inbetween--.

Line 67, "on" should read --one--.

Column 6:

Line 23, "Table-1." should read --Table 1.--

Column 8:

Line 31, "Whilst," should read --While,--.

Line 32, "5have" should read --5 have--.

UNITED STATES PATENT AND TRADEMARK OFFICE
CERTIFICATE OF CORRECTION

PATENT NO. : 5,111,338
DATED : May 5, 1992
INVENTOR(S) : HIROKI NAKAYAMA

Page 2 of 2

It is certified that error appears in the above-identified patent and that said Letters Patent is hereby corrected as shown below:

Column 10:
   Line 67, "the" (3rd occurrence) should be deleted.
Column 11:
   Line 12, "Table-2." should read --Table 2.--.
Column 13:
   Line 46, "unit" should read --units--.
Column 16:
   Line 3, "$0.3 < |51\ M_2/\Delta f| < 0.9$" should read
--$0.3 < |M_2/\Delta f| < 0.9$--.
   Line 15, "magnification" should read
--magnifications--.

Signed and Sealed this

Fourteenth Day of September, 1993

BRUCE LEHMAN

Attest:

Attesting Officer

Commissioner of Patents and Trademarks